(12) United States Patent
Terao et al.

(10) Patent No.: US 6,977,883 B2
(45) Date of Patent: Dec. 20, 2005

(54) INFORMATION RECORDING MEDIUM HAVING PAIR OF ELECTRODES

(75) Inventors: Motoyasu Terao, Hinode (JP); Harukazu Miyamoto, Higashimurayama (JP); Toshimichi Shintani, Kodaira (JP); Kyoko Kojima, Kunitachi (JP); Yuko Tsuchiya, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 10/336,717

(22) Filed: Jan. 6, 2003

(65) Prior Publication Data

US 2003/0218941 A1 Nov. 27, 2003

(30) Foreign Application Priority Data

May 27, 2002 (JP) .................................... 2002-151713

(51) Int. Cl.[7] ................................................ G11B 5/84
(52) U.S. Cl. ...................................... 369/276; 369/126
(58) Field of Search ................................ 430/320, 321; 365/174; 369/276, 13.01, 13.56, 13.02, 126, 120, 288, 292; 428/64.1, 64.4

(56) References Cited

U.S. PATENT DOCUMENTS

| | | | |
|---|---|---|---|
| 3,986,771 A | | 10/1976 | Tsukada |
| 3,989,530 A | | 11/1976 | Robillard |
| 4,075,610 A | * | 2/1978 | Crandall et al. ............... 430/19 |
| 4,324,622 A | | 4/1982 | Deb |
| 4,500,174 A | | 2/1985 | Conner |
| 4,773,060 A | * | 9/1988 | Shimada et al. ......... 369/13.37 |
| 4,842,381 A | | 6/1989 | Green |
| 4,945,515 A | * | 7/1990 | Ooumi et al. ................ 369/126 |
| 5,430,705 A | * | 7/1995 | Takanashi et al. ........... 369/126 |
| 5,629,920 A | * | 5/1997 | Sakano et al. ............... 369/120 |
| 5,717,626 A | * | 2/1998 | Aoki et al. .................. 365/112 |
| 5,903,296 A | * | 5/1999 | Shimizu et al. ............. 347/139 |

FOREIGN PATENT DOCUMENTS

| JP | 63-122032 | 11/1986 |
|---|---|---|
| JP | 2001-344807 | 6/2000 |

OTHER PUBLICATIONS

M. Terao, H. Yamamoto, and E. Maruyama, "Highly Sensitive Amorphous Optical Memory", 1973, Supplement to Journal of the Japan Society of Applied Physics, vol. 42, p. 233–238.

* cited by examiner

Primary Examiner—Tan Dinh

(57) ABSTRACT

Disclosed herewith is a method for enabling fast and high density recording of information. A voltage is applied to a recording layer formed between a pair of electrodes. The distance between the pair of electrodes is set wider at one of land and groove areas of a subject optical disk and narrower at the other, or the disk has multi-recording layer structure and light absorption occurs only in the layer on which coloring voltage is applied. The optical disk is provided with a layer of which light absorption spectrum changes according to the application of voltage, thereby absorbing the light. The layer may be the recording layer itself or a layer adjacent to the recording layer. Because a heat generates only in a selected area of the optical disk at the time of recording, the disk can also avoid cross-talks between layers during reading and can be turned rapidly and permissively to the auto focusing and tracking offsets, thereby enabling fast and high density recording. The disk can thus be formed with easily selectable multiple layers.

17 Claims, 14 Drawing Sheets

FIG.12
VIOLOGEN 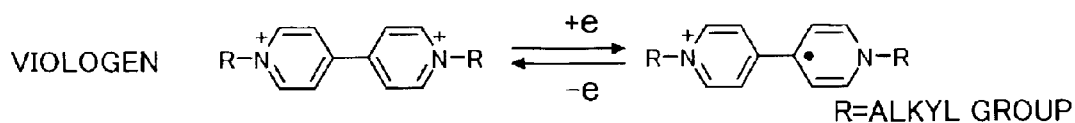
R=ALKYL GROUP
POLY(3,4-ETHYLENEDIOXYTHIOPHENE) (PEDT) 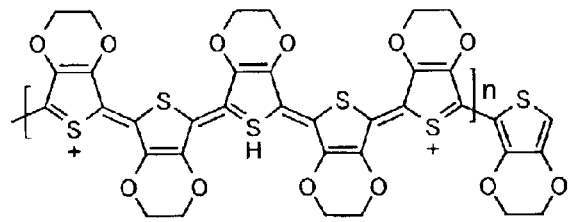
POLY(3,4-ETHYLENEDIOXYPYRROLE) (PEDOP) 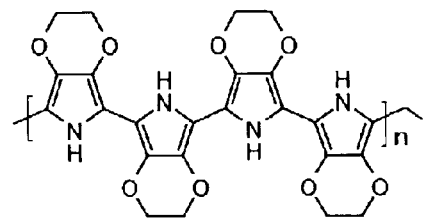
METAL NAPHTHALOCYANINE 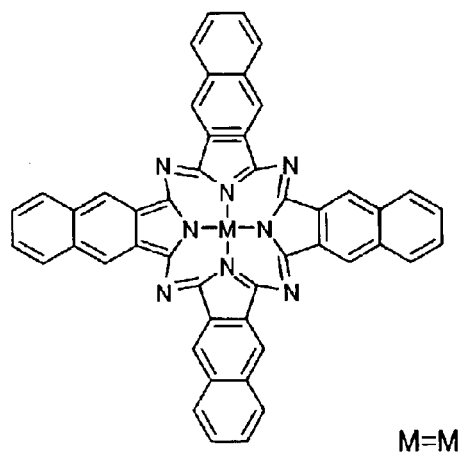
M=METAL ATOM (Zn,V)
METAL PHTHALOCYANINE 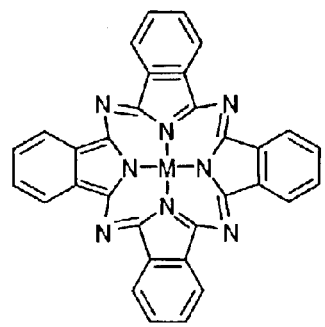

INFORMATION RECORDING MEDIUM HAVING PAIR OF ELECTRODES

BACKGROUND OF THE INVENTION

1. Field of the Invention

The present invention relates to media, methods, and apparatuses for recording and reproducing information by means of light irradiation respectively.

2. Description of Related Art

The most significant features of optical disks are removability from their recording/reproducing apparatuses and availability with low prices. Optical disk drives that use those disks are therefore configured so as to enable fast and high density recording without losing such the features of the optical disks.

So far, various well-known principles have been employed for those optical disks; each records information in its recording layer by irradiating a light therein. One of such the principles makes good use of changes of atomic configuration caused by a thermal process, that is, phase-changes of a subject film material (the phase-change is also referred to as phase transition or phase transformation) to enable the information recording medium made of the material to be rewritten many times. For example, a phase-change optical disk disclosed by JP-A No. 344807/2001 is basically configured by a protective layer, a recording film made of a GeSbTe material, a protective layer, and a reflection layer, which are formed sequentially on a substrate.

On the other hand, there are also other well-known optical disks referred to as electric-field-effect type disks. In the case of this type disk, a laser beam is irradiated to its phase-change recording film while an electric field is applied thereto so as to record information therein. This type disk has basic-structure in which a phase-change recording layer made of a GeSbTe material or the like is disposed between upper and lower electrodes. This electric-field-effect type optical disk is disclosed, for example, by JP-A No.122032/1988. This type optical disk receives an electric-field in its recording film, thereby the phase-change (crystallization) in the recording film is promoted more than other optical disks for each of which only a laser beam is irradiated to its recording film. FIG. 1 shows a configuration of such an electric-field-effect optical disk. A light 9 is condensed by a lens 8. The disk has electrodes and layers formed on a substrate 7 sequentially from the light incidence side in order of a transparent electrode 1, a UV-resin guide groove layer 2, a recording film, an heat-insulator electrode 4, an Al electrode 5, and a protective layer 6. A voltage is applied to both of the transparent electrode and the AI electrode. The UV-resin layer 2 that has a guide groove on its surface is an insulator whose specific resistance is $10^6$ Ω·cm. The UV-resin layer 2 functions as an electric-field-effect buffer layer and to form the guide groove.

A paper written by the present inventor et al (M. Terao, H. Yamamoto and E. Maruyama) and entitled as "Highly Sensitive Amorphous Optical Memory: supplement to the J. of the Japan Society of Applied Physics Vol. 42, pp 233–238" reports an experimental result that light irradiation to both of a photo-conductor and a phase-change recording film disposed between transparent electrodes while a voltage is applied to them from those transparent electrodes makes it possible to record information in the recording layer only with a laser beam that is weaker by almost two digits than any case in which only a light is irradiated thereto. On the other hand, there are also still other type optical disks like CR-R and DVD-R, each of which uses an organic-material for its recording layer. In the case of those optical disks, a laser beam is irradiated to both of a recording layer and a substrate surface adjacent to the recording layer. The recording layer includes a dye to absorb the wavelength of the recording laser, thereby the quality of the substrate surface is changed to enable information to be recorded therein.

As described above, while optical disks are all characterized by removability from their recording units, as well as availability at low prices realized by using plastic substrates, rapid operation is one of the indispensable requirements for them. And, because of such the structure, optical disks have been confronted unavoidably with problems; each of those disks repeats pitching, resulting in tracking offsets sometimes when it rotates faster. And, this comes to generate a high frequency that makes it difficult for the disk to follow up with auto-focusing and tracking. This is why the recording media have long been required to be permissive to such the tracking offset, especially when in recording during which such the trouble is apt to occur. And, this conventional problem has to be solved to speed up the operation of the recording apparatus to enable such the following-up over the mechanical vibration limit of the apparatus.

According to the technique disclosed in the above-described paper "supplement to the J. of the Japan Society of Applied Physics Vol.42" written by the present inventor et al, as well as the electric-field-effect type recording medium disclosed by JP-A No. 122032/1988, it never occurs that only one of the land area and the groove area becomes easier to be recorded, since almost the same voltage is applied to both of the areas and almost the same light absorption occurs in them. Consequently, the media in the above cases are not permissive so much to the tracking offset and accordingly they cannot cope with fast recording satisfactorily. On the other hand, in the case of the CD-R and the DVD-R, light absorption makes no difference practically between the land area and the groove area, so that no electric current application can assist the recording.

Under such circumstances, it is an object of the present invention to solve the above-described conventional problems and enable mass of information to be recorded stably and rapidly.

SUMMARY OF THE INVENTION

Hereunder, the configuration of the present invention for solving the above conventional problems will be described.

Note that, however, a long recessed portion formed on the substrate will be referred to as a groove in the present invention. An area between such grooves will be referred to as a land. Upon a light incidence to a film through the substrate, such a groove looks like a convex from the light incident side. Therefore, even in the case of the method that applies a light from an opposite side of the substrate, such a portion that looks like a convex at a view from the light incident side might be referred to as a groove in some cases. This portion is recognized as a convex when only the substrate is watched, but it is actually a land between grooves. Strictly, such a portion is not referred to as a groove in the definition by the present invention. In the case of a method for recording information in either lands or grooves, that is, in the case of the so-called in-groove recording method, the recording characteristics are often better when in recording at convex portions at a view from the light incident side regardless of whether the light incidence is done from the substrate side or from an opposite side of the substrate. However, those two methods are basically similar to each other, so that recording may also be done at recessed portions at a view from the light incident side.

Concretely, the configuration of the present invention will be as follows.

(1) A first electrode, an electro-chromic material layer, and a second electrode are disposed on a substrate of the information recording medium of the present invention, then a voltage is applied to between the first and second electrodes to flow an electric current in the electro-chromic material, which is thus colored. The information recording medium is preferably configured so that the electro-chromic material is colored in a first area while it is not colored in a second area. The first area is equivalent to a land area and the second area is equivalent to a groove area. And, because the light is absorbed only in the first area or in the second area, the easily recordable range can be identified. Consequently, information can be recorded in the target place stably regardless of slight changes of the light spot and the light condensing level, thereby the medium can record information fast and permissively to both AF and tracking offsets. The medium can also cope with high density recording.

FIG. 2 shows a structure of the information recording medium of the present invention. In order to make it easier to understand, the structure is illustrated so that a light is applied from the upper side. The medium is configured by layers and electrodes formed sequentially from the light incident side on a substrate 17 in order of a protective layer 11, a first electrode (transparent electrode) 12, an electro-chromic material layer 13, a second electrode 14, a UV-resin layer 14, and another protective layer 16. Other reference numerals are defined as follows; 18 denotes a groove area and 19 denotes a land area. Another layer, which is, for example, a thin insulator layer or layer referred to as a boundary layer may be formed between the recording layer (electro-chromic material layer) and the first or second electrode. The additional layer should preferably be 20 nm or under in thickness.

In another aspect, the information recording medium of the present invention is configured by a first electrode, an insulator film having a through opening to the substrate, a recording film formed so as to be extended from the opening onto the insulator film and enabled to record information therein, and a second electrode formed on the recording film. In this case, one of the land area and the groove area is formed as the opening of the insulator film and the insulator film is formed in the other. Consequently, only one of the groove and land areas becomes the opening of the insulator film, so that the upper and lower electrodes come closer to each other. An electric current thus flows in the area. On the other hand, an insulator film is formed in the other (the land area or the groove area), so that little electric current flows there. This is why almost no current flows between those electrodes. The current flowing range is thus limited, thereby the easily recordable range is limited.

And, due to the features described above, the medium assures stable recording regardless of slight changes of both light spot position and light condensing level, thereby enabling fast recording permissively to AF and tracking offsets. The medium can also cope with high density recording.

The present invention, therefore, intended to further improve the recording density by multi-layer recording. To form multiple layers to improve such the effective recording density (effective surface density) is also desirable for any of the conventional media. However, for a medium consisting of three or more layers, the transmission factor and the recording density comes into a trade-off relationship, and accordingly either of the reproduced signal quality or the recording sensitivity in each of the layers have been forced to be sacrificed. In order to solve such the problem, the well-known three-dimensional recording methods uses the thickness direction of each subject transparent organic material for recording information. One of the methods utilizes two-light-quantum absorption. The recording sensitivity of this method, however, is very low. And still another method that employs light polymerization has a problem that both storage stability and recording sensitivity are low.

In the present invention, two or more recording layers are formed and each recording layer is disposed between transparent electrodes to improve the transmission factor of each layer, thereby improving both recording sensitivity and reproduced signal quality.

For multi-layer recording when the subject medium consists of two or more recording layers, each of the recording layers other than the farthest one from the light incident side, when information is to be recorded therein or to be read therefrom, should preferably be disposed between electrodes and the recording/reading laser beam absorption factor should increase upon applying of a voltage between those electrodes. The farthest recording layer from the light incident side may also be processed similarly. Therefore, every layer can be disposed in the focal depth of the focusing lens, since the layer is not interfered by any other layers. The information recording medium can thus be provided with multiple layers and a large capacity than any of the conventional disks consisting of a plurality of layers respectively. To achieve this object, each recording layer or a layer adjacent to the recording layer may be stacked layer made of an organic or non-organic electro-chromic material or a mixed material layer of electro-luminescent material and a photo-chromic material. Consequently, the medium can be configured so that a light is absorbed in a target layer and almost not in other layers. It is also possible to dispose some of the layers out of the focal depth of the focusing lens and move the focal point to record/read information in/from those layers, of course. In this case, although a stacked layer consisting of many layers might cause pits and grooves for representing address information to be deformed, such the problem can be avoided by forming another layer in which those pits and grooves are copied so as to prepare for reading address information from at least one of the layers in the focal depth at the moved focal point. The above described electro-chromic material may be, for example, a polymer consisting of tungsten oxide or thiophene organic polymer molecules.

Various other electro-chromic materials such as those described in "Electro-chromic Display" issued by Sangyo Tosho (Co.) on Jun. 28, 1991 and those described in papers at present are also usable.

A phase-change recording layer (ex., $Ge_2Sb_2Te_5$ layer) may be disposed between the electro-chromic material layer and the first or second electrode. The layer should preferably be formed at the other side of the light incidence from the optical point of view. In this connection, the electro-chromic layer should have a high recording threshold value and the phase-change recording layer preferably has a high light-transmissivity and low fusing point by choosing materials including sulfur compound such as $Sb_4Te_3S_2$ so that information is recorded only in the phase-change recording layer.

(2) As shown in FIG. 3, a photo-conductor layer 23 may be formed between the first or second electrode 22 and the recording film 24. The photo-conductor layer 23 should be formed closer to the light incident side electrode than the recording film. In this connection, photo-carriers generated in the photo-conductor layer 23 due to the light irradiation are moved, thereby the resistance of the photo-conductor layer 23 lowers and both voltage and electric current applied to the recording layer 24 comes to increase sharply. As a result, the temperature of the light irradiated portion of the recording layer rises. The recording layer is thus enabled for recording. The photo-carriers may also increases through the avalanche multiplication effect. A photo-conductor film formed such way has a high—density electric current flown in the recording film, thereby the required incidence light energy is reduced. The electro-chromic material layer may also be used as a photo-conductor layer.

The recording layer may also be used as a photo-conductor layer or the recording layer may be of a type in which the electric resistance may drop upon rising of the temperature of the layer. Such a chalcogenide material as Ge—Sb—Te or the like, such an organic conductor material as polythiophene or the like are equivalent to the layer of which electric resistance drops due to a temperature rise in the layer. In FIG. 3, reference numerals are defined as follows; 21 denotes a protective layer, 22 denotes a transparent electrode, 25 denotes an insulator layer, 26 denotes a second electrode, and 27 denotes a protective substrate. The UV-adhesive layer is omitted here.

(3) A circular information recording medium may be used and provided with a third electrode that is long in the radial direction of the medium used to supply an electric current to the first and second electrodes. The third electrode can apply the same voltage up to the outer periphery of the medium.

(4) The voltage application to between the first and second electrodes during light irradiation should preferably be continued after the light irradiation. When a light is irradiated to between the first and second electrodes concurrently with a voltage, the electric current increases around the light irradiated portion as shown in FIG. 8. And, if the voltage is kept applied thereto even after the end of the light irradiation, the resistance in the portion rises due to any of the reduction of excitation carriers, the fusion of the recording film itself, the disarray/resolution of the atom/molecule configuration, thereby the electric current flow in the layer decreases automatically. After the current returns to its initial value, the state of the recording layer changes. For a disk-like medium, therefore, the powering/heating time for recording becomes almost the same at both inner periphery and outer periphery. Thus, the method will also be adaptable easily for the CAV (Constant Angular Velocity) recording. And, the electric current that flows throughout the recording medium grows into a large current, thereby preventing occurrence of insufficient supply of the current, state changes of the recording film, and excessive expansion of damaged areas. In order to achieve this object, the recording apparatus is just provided with a control circuit for suppressing the voltage application under 80% of that for enabling recording.

(5) One of the first and second electrodes should preferably be divided into a plurality of electrodes. If such an electrode is divided in the radial direction, the medium will also be suited for the CAV (Constant Angular Velocity) recording and the capacitance between electrodes can be reduced to improve the response speed.

(6) When in recording, the recording laser power can be set at over 0.2 mW to 2 mW (excl.) even at a linear recording speed of 15 m/s or over. If the recording sensitivity is such improved, a higher transfer rate can be achieved without causing insufficient laser power application even for high linear speed recording when an array laser/surface emission laser is used for simultaneous light irradiation on a plurality of spots on the medium. In this connection, it is also recommended to make pulse-like light irradiation also in erasure areas and set a pulse width wider than that of the recording mark forming pulses. Consequently, rewriting is enabled satisfactorily while it is avoided to widen the erasing width excessively. A voltage may also be applied simultaneously to at least the plurality of electrode pairs on the recording medium in units of two pairs. This method is necessary when a low material maintenance voltage is applied to cause the material color to be changed.

The recording medium of the present invention may also be provided with a plurality of recording layers and a voltage or zero-voltage is applied to only between those pairs of electrodes while a different voltage is applied to between electrodes at both sides of a target layer for recording, erasing, or reading.

(7) In order to achieve the above object, the recording apparatus of the present invention is provided with two means; one means for positioning a plurality of electrodes disposed at a portion where the rotary shaft of the disk motor or the disk receiving part attached to the rotary shaft comes in contact with the place close to the center hole of the disk so that each of the plurality of electrodes faces each of the predetermined electrodes disposed in the place close to center hole of the disk when the disk is loaded and the other means for making each electrode disposed at the rotary shaft side contact with each electrode disposed at the disk side. Consequently, a predetermined voltage comes to be applied to each electrode on the disk.

In another aspect, the information recording apparatus of the present invention is provided with a tapered projection in the vertical direction at least at one place in the circumferential direction of a side surface of the disk motor rotary axis or disk receiving part attached to the rotary shaft. The disk is provided with a plurality of divided electrodes at a portion having a height, where the disk is to be loaded. Consequently, the disk is positioned accurately in the turning direction, thereby a power is supplied accurately to each of the electrodes disposed in the multiple layers.

The present invention is thus effective for the recording density (track pitch, bit pitch) over the 2.6 GB VD-RAM standard and more effective for the recording density over the 4.7 GB DVD-RAM standard. When the light source wavelength is not around 660 nm and when the numerical aperture (NA) of the focusing lens is not 0.6, the present invention is effective for the recording density over a value calculated on those conditions in terms of wavelength ratio or NA ratio in both of the radial direction and the circumferential direction.

In this specification, a term "phase-change" is used and the "phase-change" includes not only the phase-change between crystal and non-crystal, but also the phase-change to fusion (change to the liquid phase) and re-crystallization, as well as the phase-change between crystal states.

In this specification, the present invention premises that the electro-chromic material layer mentioned above means a layer made of a material that develops its color directly (due to a light absorption spectrum change) by an applied voltage defined ordinarily and its support layer(electrolyte layer), as well as a layer including an area that emits a light due to an applied voltage (a flown electric current) and an area that develops its color or distinguishes its color with a light received from the light emitting area.

Furthermore, "the electro-chromic material of the present invention is conductive" is defined as a constant flow of an electric current of 0.1 mA or over when 2 V is applied to between the first and second electrodes of a disk whose diameter is 80 mm or over.

BRIEF DESCRIPTION OF THE DRAWINGS

FIG. 12 is a molecule structure in an organic electro-chromic material;

DETAILED DESCRIPTION OF THE PREFERRED EMBODIMENTS

<First Embodiment>
(Structure and Fabrication Method)

Figure 3:
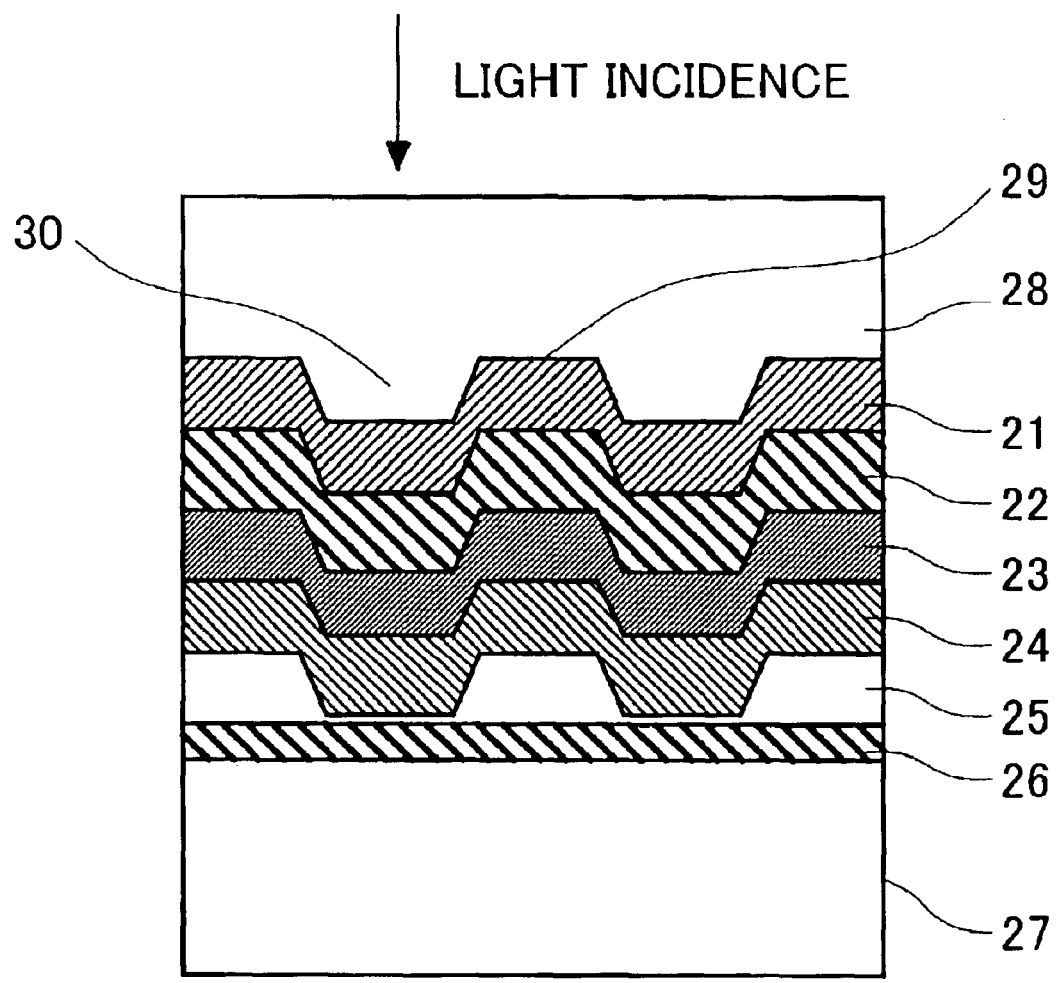
FIG. 3 is another cross sectional view of the information recording medium in another embodiment of the present invention.
Figure 4:
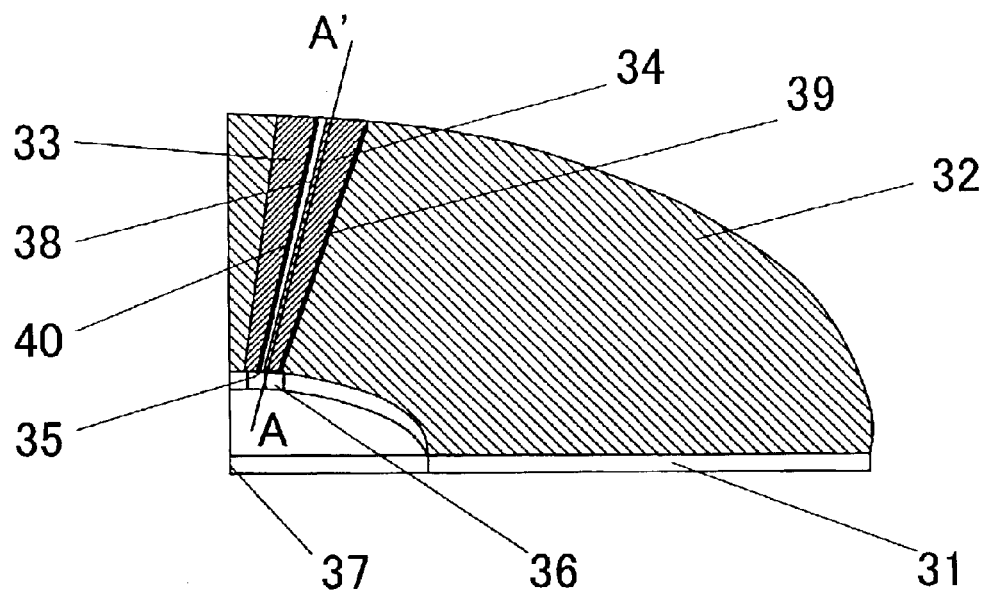
FIG. 4 is a ¼ view of the information recording medium in the embodiment of the present invention.
Figure 5:
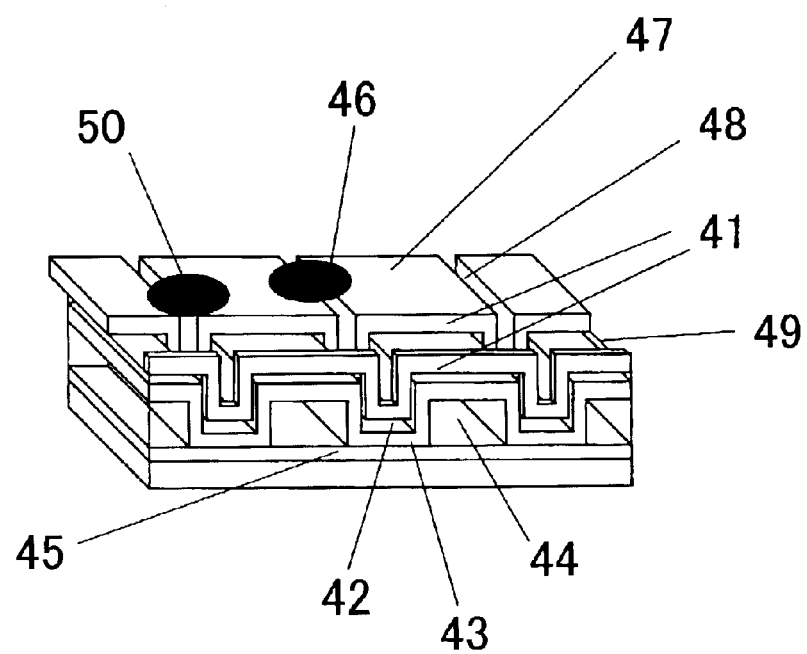
FIG. 5 is a bird's-eye view of part of the information recording medium in the embodiment of the present invention.

FIGS. 4 and 5 show structures of a disk-shaped information recording medium in the first embodiment of the present invention. FIG. 4 shows a ¼ size view of the structure of the disk and FIG. 5 shows an expanded view of the ¼ size portion of the disk. In FIG. 4, only two upper radial-patterned transparent electrodes 33, 34 are shown while many more are disposed actually all over the disk surface. A light for recording/reading is irradiated from above through the substrate while the top substrate is not shown in FIG. 4. FIG. 5 shows an expanded view of part of the disk. Also in FIG. 5, the top substrate and the insulator layer are not shown so as to simplify the description. In FIG. 5, reference numerals are defined as follows; 45 denotes a reflection electrode, 43 denotes a recording layer, 44 denotes an insulator layer, 42 denotes a photo-conductor layer, 41 denotes a transparent electrode, 46 and 50 denote light spots, 47 denotes a groove area, and 48 denotes a land area. Usually, information is recorded/read in/from portions referred as to groove areas, which look like convex portions at a view from the light spot. In this embodiment, however, information is recorded in land areas. The notches shown beforehand in FIG. 5 are part of the A–A' cross section and the upper notches 49 shown in FIG. 5 correspond to gaps 38 between radial patterned electrodes shown in FIG. 4. The entire A–A' cross sectional view becomes as shown in FIG. 3.

Figure 6:
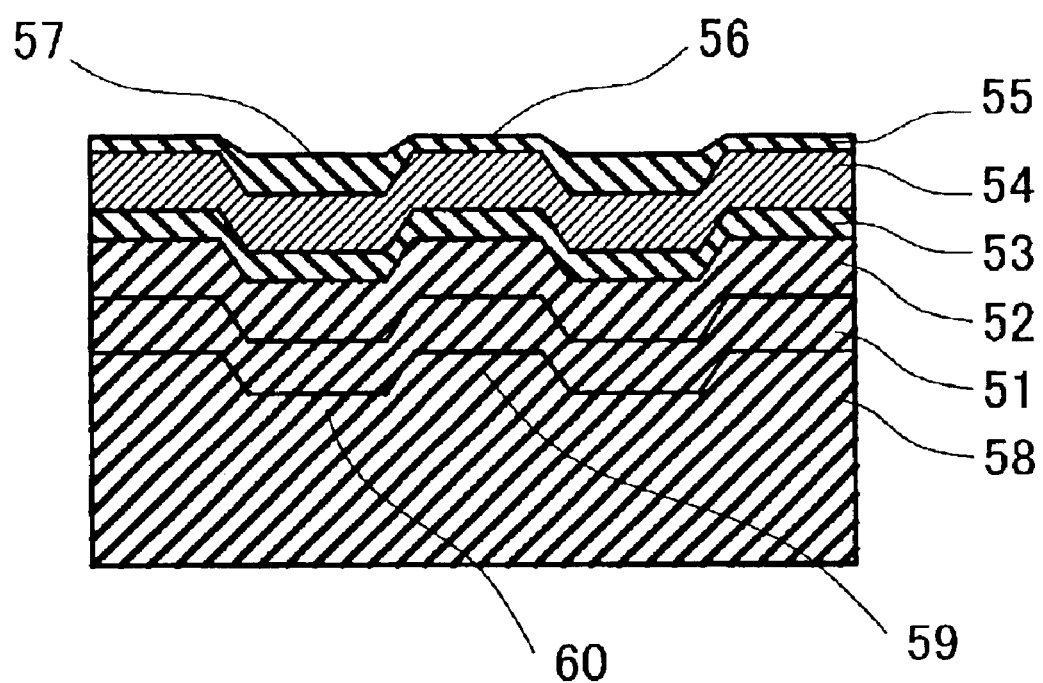
FIG. 6 is a cross sectional view of the recording medium to be subjected to an etching process for exposing an insulator layer thereof in the embodiment of the present invention.

This recording medium is fabricated as follows. At first, as shown in FIG. 6, a tracking groove (width: 0.25 micron) is formed on a polycarbonate substrate 58. The groove is used for in-groove recording (recording in the land area at a view from the light spot here) at 0.45-micron track pitches at a diameter of 12 cm and a thickness of 0.6 mm. Addresses are represented by the groove wobbling on the substrate. On the substrate are also formed transparent electrodes (ITO) 51 made of $(In_2O_3)_{90}(SnO_2)_{10}$ at a film thickness of 30 nm. A groove pattern is then copied onto the surface of the substrate with use of a mother to which the pattern is copied once from a nickel master formed by plating the photo resist of the original disk. This is to correspond the exposed photo-resist of the groove to the land. FIG. 6 shows processes for forming the films on the substrate 57. Note that the structures shown in FIGS. 4 and 5 are upside down in FIG. 6. Then, an $As_3Se_{97}$ layer 52, which is a photo-conductor layer, is formed at a thickness of 50 nm. After this, a Ge—Sb—Te recording layer 53 is formed at an average film thickness of 10 nm. This transparent electrode layer is formed by means of spattering through a mask, thereby the electrode is isolated in the radial pattern area 20 corresponding to the recording sector. Then, a $SiO_2$ layer, which is an insulator layer 54, is formed at a thickness of 120 nm. It is followed by forming an acrylic-resin layer 55 at an average thickness of 25 nm as shown at the top in FIG. 6. A ultra-violet light having a wavelength of 254 nm is applied to the layer 55 to etch until the relatively thin resin layer 56 above the land area 59 is removed. At this time, the relatively thick layer 57 above the groove area 60 becomes thin relatively, but remains as a mask. This is followed by performing reactive ion etching for the layer 56 to remove the $SiO_2$ layer from the land area, thereby the recording layer 53 is exposed. In other words, a through-opening to the insulator layer is formed. Such the method in which the film thickness of a layer is changed between the land and the groove to improve the recording sensitivity in one of the land and the groove, thereby increasing the permissiveness to both tracking and auto-focusing offsets is also effective for recording media to which only a light is applied to record information (while no voltage is applied). After this, the acrylic resin is almost completely removed from the substrate surface by means of plasma asher. As a result, the information recording medium in this embodiment comes to be structured as shown in FIG. 3. In the case of the recording medium in this embodiment, the total film thickness at each portion between electrodes depends significantly on whether or not an insulator film exists there; the film thickness differs by twice or more between existence and non-existence of the insulator film. And, because the resistance of the $SiO_2$ layer is larger than those of other layers, the resistance of every layer between electrodes takes a ratio of 1:2 or over between the through-opening and each of other portions. When the recording layer is a phase-change recording layer, any of such the Ge—Sb—Te recording materials as known $Ge_2Sb_2Te_2$, $Ge_5Sb_{70}Te_{25}$, etc, as well as an Ag—In—Sb—Te recording materials is usable. The recording layer may also be made of an electro-chromic material such as polythiophene to be described in detail in the second embodiment. Next, a $W_{80}Ti_{20}$ film is formed at a thickness of 50 nm. The film is used as both of a reflection layer and a second electrode layer 45. A magnetron spattering apparatus is used for forming the stacked film.

Voltage application to the outer periphery of the disk might often be disturbed by the transparent electrode sheet resistance and the thinner portions of the transparent electrodes formed at angles of convex and concave portions of the groove. And, to avoid this problem, one or two thin metallic (AI or Ag is recommended) electrodes 39/40 should preferably be formed on the substrate before the transparent electrodes are formed on the substrate. The electrode 39/40, which is narrower than the radial patterned transparent electrode, is a thin metallic electrode extended from the inner periphery to the outer periphery of the disk and about 100 microns in average width in the radial direction and 50 nm to 200 nm in film thickness. These metallic electrodes are formed on the medium by means of spattering through a mask. These electrodes are avoided when in recording/reading.

Unlike the above embodiment, when information is to be recorded in a portion that looks like a groove at a view from the light spot, it is just required that the transparent electrode layer and the reflection & electrode layer are replaced with each other and the light is irradiated from the protective substrate side. In this case, the nickel master is used to form the substrate, not the mother one. The protective substrate may be thinned to about 0.1 mm and the NA of the focusing lens may be increased to 0.85. As a result, the track pitch can be narrowed to about 0.33 micron, which is about ¾ of that in the above embodiment.

Figure 1:
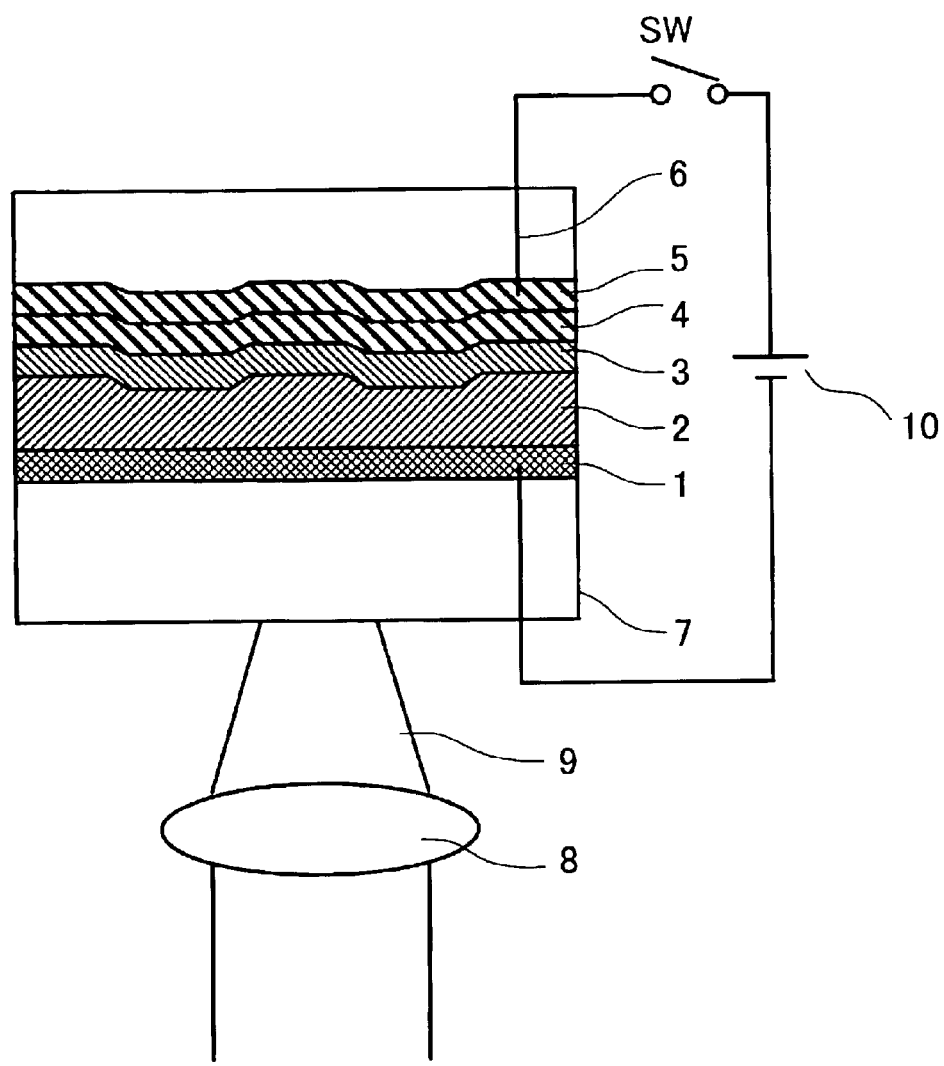
FIG. 1 is a structure of a conventional information recording medium.
Figure 2:
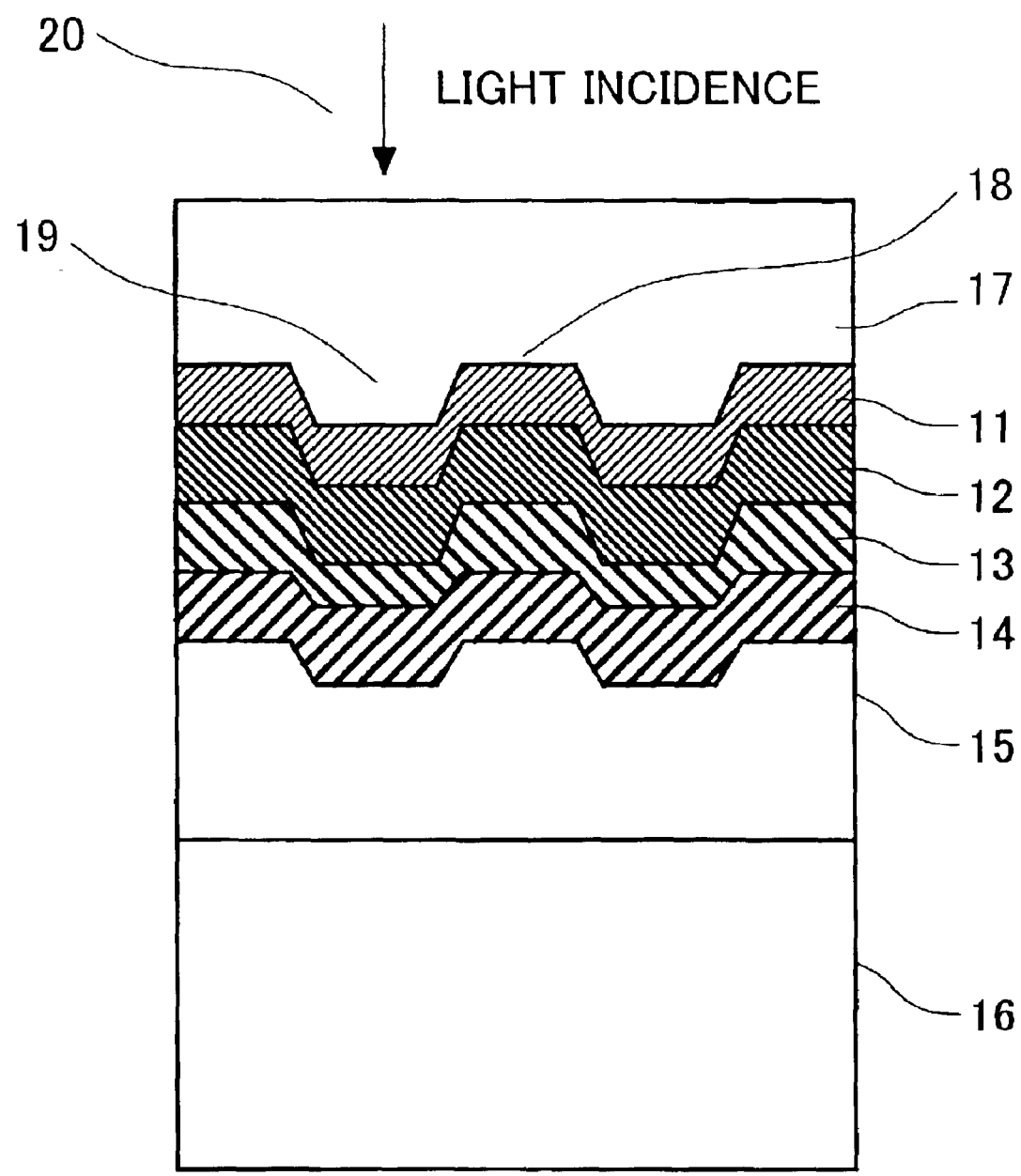
FIG. 2 is a cross sectional view of an information recording medium in an embodiment of the present invention.

Although a photo-conductor layer is employed in this example, if the recording film is also used as a photo-conductor layer, there is no need to form the above-described photo-conductor layer; for example, only an electro-chromic material layer or phase-change recording layer may be formed between electrodes. In such a case, the insulator layer can be omitted, so that the cross sectional view of the recording medium becomes as shown in FIG. 2. The electro-chromic material layer will be described in detail in the second embodiment. In this embodiment, a thiophene derivative material is used. Other materials to be described in the second embodiment are also usable, of course. The electro-chromic material layer, as to be described in detail in the second embodiment, consists of three layers, which are formed by means of coating, vacuum deposition, or electrical field polymerization. The polymer layer of the three layers is formed by means of coating, so that the film thickness is thin in the land area and thick in the groove area on the substrate as shown in FIG. 2. The electro-chromic material layer develops its color when a voltage is applied to between the transparent electrode layer and the electrode layer. However, because the distance between electrodes in the land area is shorter, the land area develops its color earlier. If the land area develops its color due to a voltage applied thereto as described above and the voltage application stops or it is controlled low while the groove area does not develop its color enough to suppress or keep the color development, then recording and reading are done accurately even upon occurrence of a tracking offset caused by the faster rotation of the disk during recording/reading. This is because the light absorption becomes higher only in the land area.

A very thin conductor layer (metallic layer or transparent electrode layer) should preferably be formed between a recording layer and a photo-conductor layer so as to suppress mutual dispersion/reaction. If the layer is formed, the reliability of the medium will increase more when in repetitive rewriting. In this case, however, the film thickness should be 1 nm or over and 10 nm or under so that the photo-carrier generated in the photo-conductor layer breaks through the layer. The film may be a band-like or reticulate discontinuous film. For example, if a 5 nm thick $W_{80}Ti_{20}$ electrode layer is formed between the recording layer and the photo-conductor layer, the surface potential can be set in uniform, mutual dispersion between the recording layer and the photo-conductor layer can be prevented during rewriting, thereby the number of rewriting times is improved by a single digit.

A plurality of radial pattern transparent electrodes may be replaced with one electrode formed all over the disk surface. However, when the plurality of radial pattern electrodes are used, the capacitance between electrodes becomes smaller, thereby the voltage supply can start and stop quickly. The capacitance between electrodes should preferably be 0.1 F or under, since both time and electric current required for coloring/decoloring are within a predetermined range. The recording medium should be structured so as to control the capacitance between electrodes to 0.1 F or under to keep the good characteristics of the elements. Instead of dividing the transparent electrode, the metallic electrode may be divided or both of the upper and lower electrodes may be divided. If an electrode is divided such way, whether or not the breaks of the divided upper and lower electrodes are aligned is no matter.

Figure 7:
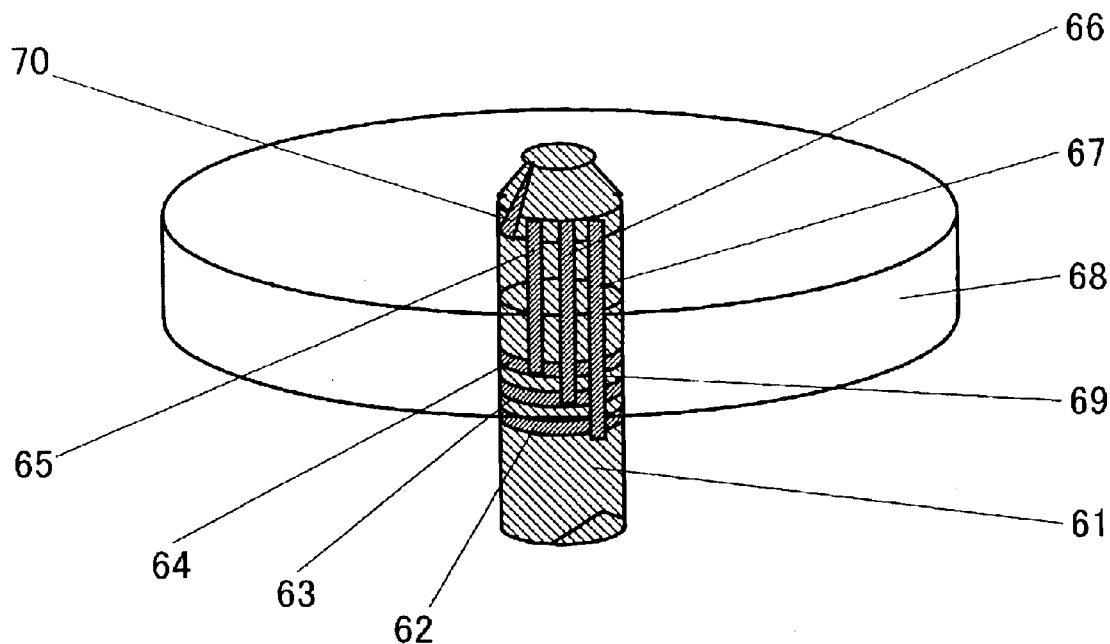
FIG. 7 is an electrode disposed in part of a disk holder in which the information recording medium in the embodiment of the present invention is to be loaded.

A leader electrode is formed at the innermost periphery of each of the above transparent electrodes and a layer as both the reflection layer & electrode. These leader electrodes reaches the innermost area of the disk and is connected to corresponding one of a plurality of electrodes 35 and 36 disposed at the end face of the disk's center hole so that it is connected to another electrode on the disk rotary shaft of the recording/reading apparatus as shown in FIG. 4. As shown in FIG. 7, six electrodes are bonded separately (only three 65 to 67 of the six electrodes are shown in FIG. 7) on the side of the rotary shaft 61 which extends through the disk sustainer 68 at a height, where the disk is to be loaded. At one place around the rotary shaft is formed a tapered projection 70 or a concave in the vertical direction, which is fit by a concave or convex formed in the disk's center hole to positioning the disk, thereby predetermined electrodes come in contact with each other. Each electrode of the disk's rotary shaft receives a power supplied from the circuit board of the recording apparatus by a combination of a plurality of brushes and rings 62 to 54. The power supply method may be replaced with another. For example, instead of the brushes and rings (slip rings), a non-contact method may be employed. The non-contact method combines laser, or LED with a solar battery. The rotary-connector method uses a rotary connector in which a tip of a contact put in a mercury tank is rotated. The rotary connector is available on the market.

A UV-curing resin is coated on the film surface of the above-described disk member, then stacked on another same shape substrate to complete the disk-like information recording medium of the present invention.

The laser beam for recording/reading is irradiated on the medium from the substrate side. The transparent electrode layer formed on the medium last may be used as a transparent electrode layer so as to irradiate the laser beam on the medium from the protective substrate side. In this case, the thickness of the recording film is decided so that the reflection rate becomes about 10% to satisfy a required read contrast ratio.

[Initial Crystallization]

The phase-change recording layer of the disk fabricated as described above is crystallized in the initial stage as follows. The disk is turned and a laser beam having a power of 800 mW is applied to the recording layer 24 through the substrate 28. The laser beam spot of the semiconductor laser (wavelength: approx. 810 nm) is elliptic long in the radial direction of the medium. The laser beam spot is then moved step by step in units of ¼ of the spot length in the radial direction of the medium. The medium is thus crystallized in the initial stage. This initial crystallization may be done only once. When this crystallization is done twice, the noise to be caused by crystallization is a little suppressed.

(Recording, Erasing, and Reading)

Figure 9:
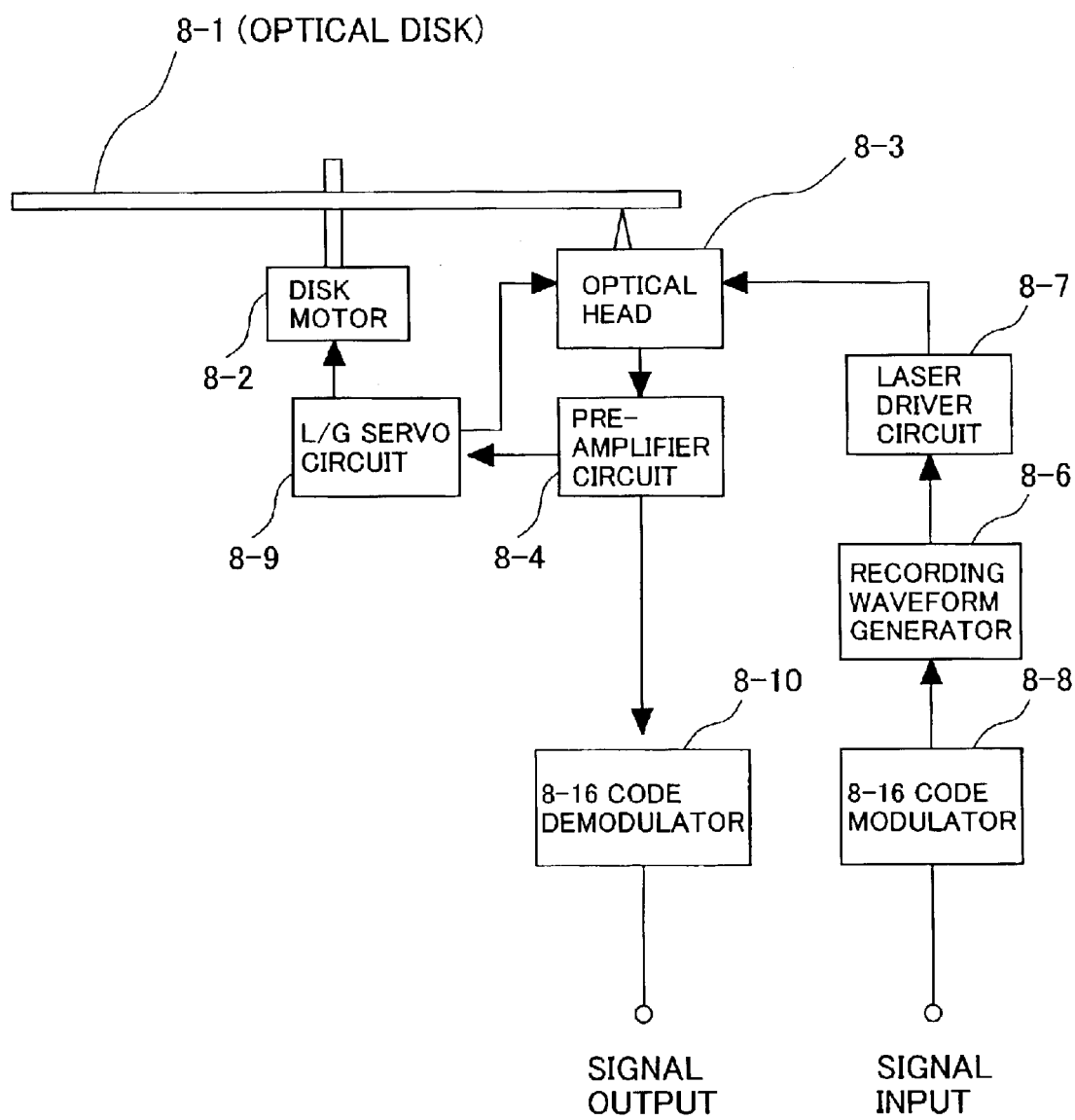
FIG. 9 is a block diagram of the information recording medium of the present invention.

Information is recorded/read in/from the above-described recording medium as follows. Hereinafter, how the recording/reading is done will be described with reference to FIG. 9. The ZCAV (Zoned Constant Linear Velocity) method is employed for controlling the motor to change the rotation speed of the disk in each zone for recording/reading.

Information from external is received in units of 8 bits and transferred to an 8-16 modulator 8-8. When information is to be recorded on the information recording medium (hereinafter, to be referred to as the optical disk) 8-1, a so-called 8-16 modulation method is used to convert 8-bit information to 16-bit information. This modulation method records information having a 3T to 14T mark length corresponding to 8-bit information. The 8-16 modulator 8-8 in FIG. 9 performs such the modulation. The "T" mentioned above means a clock cycle at the time of recording. The optical disk is turned so that the relative speed with respect to each light spot becomes a linear speed of 15 m/s.

The 3T to 14T digital signals converted by the 8-16 modulator 8-8 are transferred to a recording waveform generator 8-6, so that a multi-pulse recording waveform is generated there.

At this time, the power level for forming recording marks is set at 5 mW, an intermediate power level for erasing the recording marks is set at 2 mW, and a reduction power level is set at 0.1 mW respectively. The laser power for forming recording marks can be lowered in response to the rising of the applied voltage. The recording is done satisfactorily within a range over 0.5 mW to 5 mW. No significant change appeared within the range even when the linear speed is changed to another from 15 m/s. Reading from the medium is done at 1 mW with no voltage application. Reading is practically possible within a range over 0.2 mW to 2 mW. When in reading at a power level over 2 mW for a long time, recorded data is degraded. In the above-described recording waveform generator, 3T to 14T signals are corresponded to "1" and "1" alternately in a time series. At this time, non-crystallization occurs in each area (mark area) in which high power level pulses are applied. The recording waveform generator 8-6 has a multi-pulse waveform table corresponding to a method (adaptive recording waveform control) for changing the pulse widths of both leading and trailing pulses of the multi-pulse waveform in correspondence with the length of each space before and after each mark area. The recording waveform generator 8-6 thus uses the table to generate multi-pulse recording waveforms free of the thermal interference that might occur between recording marks.

The recording waveform generated by the recording waveform generator 8-6 is transferred to a laser driver circuit 8-7 and the laser driver circuit 8-7 emits a light of the semiconductor laser disposed in the optical head 8-3 according to this recording waveform.

The optical head 8-3 installed in this recording apparatus uses a semiconductor laser having a light wavelength of 400 nm used for recording information. The objective lens having a lens NA of 0.65 focuses this laser beam on the recording layer of the optical disk 8-1 to apply the laser beam to the target area so as to record information therein.

Figure 8:
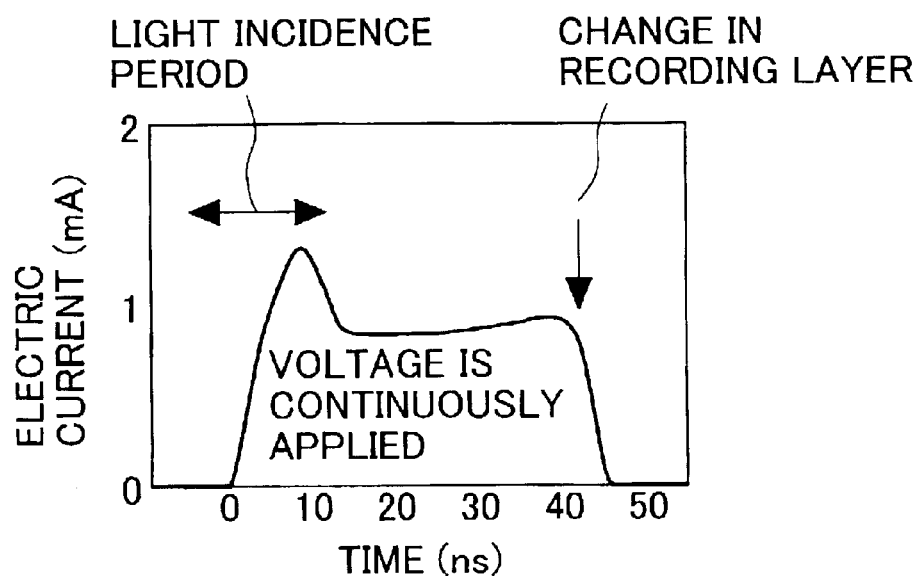
FIG. 8 is a chart for denoting changes of a current with time, which flows in one recording spot of the information recording medium of the present invention.

In the phase-change recording layer, the reflection rate of the medium becomes higher in the crystal state than that in the non-crystal state which is set after information is recorded therein. While information is recorded by means of laser beam irradiation, a 5 V voltage is applied continuously to between upper and lower electrodes of the recording layer. And, photo-carriers (electrons, pairs of positive holes) are generated in the Se—As layer, which is a photo-conductor layer, due to the irradiated pulse laser beam, thereby the electric resistance lowers. As a result, the voltage applied to this portion in the recording layer rises, thereby an electric current path is formed in the recording layer. In addition, an area is formed in the recording layer. In the area, the fusing point is exceeded by the Joule heat of the electric current. After this fusing, the electric resistance in this area rises, thereby the electric current path disappears and the area cools down to become non-crystallized. Consequently, both deflection rate and extinction coefficient are changed, thereby signals can be read from this area optically. By repeating the irradiation of this pulse laser beam according to information signals, non-crystal recording mark strings are formed. When the recording is speeded up, the laser beam point is moved fast and the electric current keeps flowing until the recording layer is fused and the electric resistance in the area rises even after the laser beam irradiation as shown in FIG. 8 (electric current changes with time). The electric current thus flows in a plurality of places simultaneously, then the current stops sequentially in order of current application start.

Because the recording is done in such the mechanism, the current flowing time is almost fixed regardless of the radius of the disk, although the laser spot passing time depends on the radius of the recording track. It is therefore easy to record information at a fixed ration speed (CAV) that is difficult on ordinary phase-change optical disks. A voltage is applied sequentially to each of the plurality of divided transparent electrodes in each laser-beam-irradiated area.

Because of the high recording sensitivity, the above recording medium enables recording to be made in a plurality of laser spots simultaneously. In addition, because the light absorption is not required so much, both high reflectivity and high transmittance are obtained for recording and a high S/N ratio is assumed for reading. When voltage application is suppressed upon reading, a high laser power is assumed for reading, thereby a high S/N ratio is obtained.

The recording medium in this embodiment is structured so that upper and lower electrodes are disposed closely to each other only in the groove area. A high electric field is thus applied just in a narrow range in the recording film. Consequently, stable information recording is assured regardless of slight changes of the laser spot and/or the light condensing level, thereby the recording medium becomes permissive to the AF and tracking offsets, sensitive to a light, and suited for recording at a fast rotation of the medium.

The recording medium in this embodiment can also obtain a light reflection contrast ratio of about 2:1 between recording marks and other portions. When the contrast ratio lowers, the fluctuation of read signals to be caused by noise exceeds 9% of the upper limit, thereby practical read signal quality comes to exceed the limit. To avoid this problem, $SiO_2$ is included in the transparent electrode layer to form a $(SiO_2)_{40}(In_2O_3)_{55}(SnO_2)$ layer. As a result, the reflection rate lowers to improve the contrast ratio to 2.5:1 or over.

Because of the recording principles as described above, a plurality of laser beam spots are formed in the same recording track or different recording tracks with use of a single or a plurality of optical heads, thereby information is recorded easily in the track(s) simultaneously.

When in erasing, an applied voltage is lowered and the laser beam is applied continuously to the target non-crystal area to crystallize the area. A pulse laser beam may be used for this erasing and the laser beam pulse may be wider than any of the recording pulses.

The recording apparatus of the present invention can employ a method for recording information in the land area (a variation of the so-called in-groove recording method).

The above optical head(s) are also used for reading recorded information. Concretely, a laser beam is irradiated on each recorded mark and reflected beams from the mark and another portion are detected to obtain a read signal. The amplitude of this signal is amplified by a preamplifier circuit, then converted to 8-bit information by an 8-16 demodulator 8-10 in units of 16 bits. This completes the reading of the recorded marks.

When in recording with use of mark edges under the above conditions, the shortest mark 3T becomes about 0.20 $\mu$m and the longest mark T14 becomes about 1.96 $\mu$m in length respectively. Each record signal includes dummy data in both start and end parts respectively; in the dummy data, a 4T mark and a 4T space are alternated and the start part also includes a VFO.

(Mark Edge Recording)

The mark edge recording method is employed for high density recording in DVD-RAM and DVD-RW. This mark edge recording makes both edges of each recording mark formed on the subject recording film correspond to "1" of digital data, thereby the length of the shortest recording mark can be corresponded to 2 to 3 reference clock pulses so as to realize high density recording. The DVD-RAM employs the 8-16 modulation method and extends the length of the shortest recording mark to three reference clock pulses. When compared with the mark position recording method that makes the center of each circular recording mark to "1" of digital data, the mark edge recording method is more effective, since it realizes high density recording without reducing the recording marks so much in size. In spite of this, it is required that shape distortion of recording marks must be minimized for the recording media that employ this mark edge recording method.

(ZCLV Recording Method and CAV Recording Method)

Phase-change recording media, when the recording waveform remains the same, should preferably be enabled to record information at an optimal linear speed corresponding to the crystallization speed to obtain satisfactory recording/ reading characteristics. When accessing a space between recording tracks that are different from each other in radius on a disk, it takes much time to change the disk rotation speed so as to equalize the linear speed between those tracks.

In order to solve this problem, the DVD-RAM employs the ZCLV (Zoned Constant Linear Velocity) method, which divides the disk surface into 24 zones in the radial direction, fixes the disk rotation speed in each zone, and changes the disk rotation speed only when a zone to access must be changed to another. According to this method, the linear speed differs slightly between the innermost track and the outermost track in each zone, so that the recording density also comes to differ between those tracks. Nevertheless, the method makes it possible to record information almost at the maximum density all over the disk.

On the other hand, the CAV recording method that keeps a fixed disk rotation speed is suited for recording in which the disk rotation is kept as a fixed speed even upon an access to be made by skipping a far distance in the radius direction. This method is also suited for mobile devices that can suppress the power consumption required for changing the disk rotation speed. As described above, because the present invention also makes it possible to keep a fixed heating time regardless of the position in the radial direction of the disk, it makes the CAV recording easier.

The present invention also considers preventing of re-crystallization as important. This is because the temperature in adjacent tracks is apt to rise when re-crystallization occurs in peripheral areas of a recording film that is fused due to the recording therein, thereby remaining non-crystallized recording mark area is narrowed and a wider area must be fused to form recording marks in a predetermined size. The present invention can also prevent such the re-crystallization, since the heat conductivity of the transparent electrodes is low, so that the heat dispersion towards the inner periphery of the disk is not so much. The present invention also makes it possible to prevent a problem that the heat in the center of each recording mark is diffused in the transverse direction and the peripheral area of the fused area cools down slowly, thereby the re-crystallization that is apt to occur around there is suppressed.

(Tracking Margin)

Figure 10:
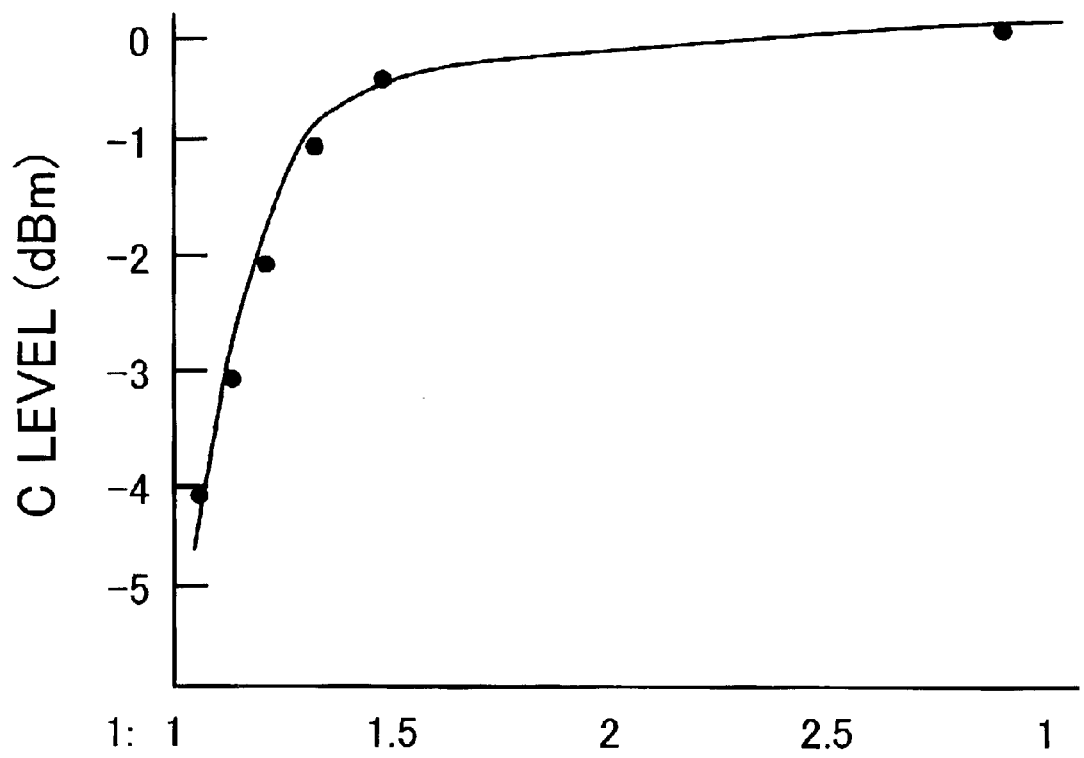
FIG. 10 is a chart for describing a relationship between a ratio of the distance between electrodes and a drop of a signal level due to a tracking offset.

In this embodiment, the upper electrode is in direct contact with the recording film in the land area and an $SiO_2$ layer that is an insulator layer is disposed between the upper electrode and the recording film in the groove area. Therefore, the electrode distance ratio between the land area and the groove area is 60:180, that is, 1:3. Usually, a tracking offset occurs due to the decentering of the inner/outer diameter of the disk and the offset occurrence increases in proportion to the disk rotation speed. The present invention, however, has successfully reduced such the offset occurrence during recording, since the recording medium is structured so that both electrode layer and recording layer come in contact with each other only in the land area or color development occurs and the heat generation increases therein. When a boundary layer is formed between an electrode and a recording layer, the electrode distance ratio between the land area and the groove area becomes 65:145 if the boundary layer is 5 nm in thickness. If a tracking offset exceeds $\frac{1}{10}$ of the track pitch, which is the normal upper limit, the distance ratio comes to have a relationship with a cross erasure event in which data is erased from part of a recorded area in an adjacent track, thereby the signal level drops. The relationship becomes as shown in FIG. 10.

| Electrode distance ratio | Signal level drop |
| --- | --- |
| 1:3 | −0.1 dB |
| 1:1.5 | −0.5 dB |
| 1:1.4 | −1 dB |
| 1:1.3 | −2 dB |
| 1:1.1 | −3 dB |
| 1:1.05 | −4 dB |

As shown above, the distance ratio should preferably be 1:1.1 or over, and more preferably it should be 1:1.4 or over. The same effect is also obtained from another recording method in which only a high power laser beam is irradiated on the target; no voltage is applied.

(Recording Layer)

Various recording layer materials are usable in accordance with the required recording speed and other characteristics, for example, those employed for optical disks. Other usable materials are Ge—Sb—Te materials, each consisting of $Ge_2Sb_2Te_5$, $Ge_4Sb_2Te_7$, or $Ge_5Sb_{70}Te_{25}$, Ag—In—Sb—Te materials consisting of $Ag_4In_6Sb_{65}Te_{25}$, etc. Although those materials disable phase-changes and frequently rewriting employed as recording functions, those disabled functions may be realized by other functions such as forming of holes in the recording layer (electro-chromic material layer, phase-change material layer, etc.) itself, color development capability break-down, color changes, as well as changes and transformation of adjacent photo-conductor layer and substrate.

Organic materials are also usable in the case where rewriting is not required so frequently. And, other various types of organic conductor materials to be described in detail in the second embodiment, as well as coloring matters whose conductivity is not so high, photo-chromic coloring matters, and other known coloring matters used for CD-R and DVD-R are also usable. When any of those coloring matters is used, the recording mechanism to be employed will become optical changes or hole forming to be caused by structure changes of the subject organic material itself and/or photo-conductor layer and/or the substrate surface to occur due to the action of the laser beam and/or electric current. For a material whose conductivity is not so high, the film should be as thinned as possible as long as the film is not eaten into conspicuous holes from the beginning.

(Photo-conductor Layer)

Because the substrate is subjected to a high temperature thermal process, the substrate material is limited. However, in addition to the above As—Se materials, such known non-organic photo-conductor materials as CdTe, CdS, CdSe, etc., as well as such organic conductor materials as polythiophene, etc. to be described in detail in the second embodiment are usable as the colored photo-conductor material described above.

(Boundary Layer)

A boundary layer should preferably be disposed between a recording layer and an electrode to speed up both crystal core forming and crystal growing, thereby speeding up the crystallization. As such the boundary layer material, a group consisting of the following should preferably be used. Concretely, the group consists of such a Ta oxide as $Ta_2O_5$, such a Cr oxides as $Cr_2O_3$, such an Al oxide as $Al_2O_3$, such an Si oxide as $SiO_2$, such a Ge oxide as $GeO_2$, such an Sn oxide as $SnO_2$, such a Zr oxide as $ZrO_2$, such an oxide as Co and Ni, a single nitride or a compound of two or more of nitrides of Cr, Ge, Ti, Al, Si, Ta, Zr, B, and Hf. Among those, $Cr_2O_3$ is more preferable, since it can suppress the reflectivity fluctuation in frequently rewriting to 5% or under and reduce the jittering. CoO, $Cr_2O$, and NiO are also more preferable, since the crystal grains become uniform in diameter in the initial crystallization, thereby the rising of the jittering can be suppressed in the initial stage of rewriting. AlN, TaN, TiN, ZrN, BN, CrN, $Cr_2N$, GeN, HfN, or $Si_3N_4$, Al—Si—N materials (ex., AlSiN2), Al—Ti—N materials, Si—Ti—N materials, Si—O—N materials, and a compound of those nitrides are also preferable, since the adhesive power becomes stronger and the information recording medium is less degraded by external shocks. In addition, such a Cr—Ge material as Cr80Ge20, a material that includes 60 mol % or more of an oxide or nitride consisting of Cr and Ge will improve the recording medium storage life and keep the high performance even under high temperature and high humidity.

(Materials of Electrodes)

A preferable electrode material depends on the utilization. When rewriting is to be done frequently, the material should be tungsten or molybdenum, or a material that includes at least either of them and another metallic element such as titanium or the like by less than 50 atomic %.

On the other hand, when recording is to be done just once, that is, recording or rewriting from/in a draw-type optical disk is to be done so frequently, a metal suited for optical disks because of its optical characteristics and thermal diffusivity should be used for electrodes. A metallic layer whose reflectivity and thermal conductivity are high, when it is Al or an Al alloy, should be a high thermal conductivity material that includes such additive elements as Cr, Ti, etc. by 4 atomic % or under, since it is effective to prevent the temperature on the substrate surface from rising. In addition, the following are also usable; a single element of Au, Ag, Cu, Ni, Fe, Co, CR, Ti, Pd, Pt, W, Ta, Mo, Sb, Bi, Dy, Cd, Mn, Mg, and V, or any of the Au alloy, the Ag alloy, the Cu alloy, the Pd alloy, and the Pt alloy, any of Sb—Bi, SUS, and Ni—Cr, or an alloy mainly consisting of those elements, or an alloy consisting of those elements equally. The layer used as both an electrode layer and a reflection layer consists of a metallic element, a half-metallic element, an alloy of those elements, or a compound of those elements as described above. Among them, a single element of Cu, Ag, and Au, or any of the Cu alloy, the Ag alloy, especially, a material that includes such additive elements as Pd, Cu, etc. by 8 atomic % or under, a material such as an Au alloy whose thermal conductivity is high, since they can suppress the thermal degradation of the organic materials. For the transparent electrode material, the following known materials are usable; a material consisting of $(In_2O_3)_x \times (SnO_2)_{1-x}$ (x: 5% to 99%), more preferably from the standpoint of resistance, a material that includes 90% to 98% of the x, a material to which SiO2 whose mol % is 50% or under is added, a material obtained by adding another oxide such as Sb2O3 whose mol is 2 to 5% to SnO2, as well as any of such conductor organic materials as polythiophene, polyacethylene, etc.

(Insulator Layer)

The fusing point of an insulator layer around a recording layer should preferably be 600° C. or over. When a material whose fusing point is lower than 600° C. is used for the insulator layer, the insulator layer will be degraded due to the heat generated in the recording layer or in the insulator layer itself when in recording and the optical characteristics might be changed, thereby the S/N ratio lowers. Such the recording/reading characteristics are improved when the thickness and material of each of the above layers are decided within the preferable range with respect to each of the above items. Those preferable ranges can also be combined to further improve the recording/reading characteristics of the media. And usable insulator layer materials are a single element of $SiO_2$, $Al_2O_3$, $Cr_2O_3$, $Ta_2O_5$, $GeO_2$, GeN, and $Si_3N_4$, any of oxides and nitrides in which the composition ratio of those elements is different from each other. Insulating organic materials are also usable.

When an organic material is used to form an insulator layer, a photo-conductor layer, and a recording layer by means of vacuum depositing, especially by means of coating, the distance between electrodes comes to differ naturally between the land area and the groove area when the insulator layer is formed; there is no need to use other processes for generating a difference in film thickness between those land and groove areas. The electric current can thus be concentrated effectively in the layer.

(Substrate)

In this embodiment, a polycarbonate substrate 77 is used. The substrate 77 has a tracking groove formed directly on its surface. A substrate having such a tracking groove comes to be a substrate that has a groove of $\lambda/15$ n or over (n: refractivity of the substrate) entirely on the surface or part of the surface when the recording/reading wavelength is assumed to be $\lambda$. The groove may be continuous or discontinued in one round. When the groove is about $\lambda/12$ n in depth, the balance between tracking and noise is found to become satisfactory. The groove width may differ among places. The substrate may be formatted so as to record/read information in/from both groove and land areas or it is formatted so as to record/read in/from only either of the groove and land areas. For a substrate formatted so as to record information only in the groove area, the track pitch should preferably be around 0.7 times the NA of the wavelength/focusing lens and the groove width should preferably be around ½ of the value.

(Recording Laser Power)

An electric current flows in the recording medium in this embodiment when in recording, so that a low laser power is usable to record information. For example, when the recording linear speed is 15 m/s or over, the laser power comes to exceed 10 mW for ordinary recording media. In this embodiment, however, the recording laser power can be set over 2 mW and under 2 mW. The optimal recording laser power differs among flown electric current values.

(Reading Laser Power)

On the other hand, the present invention employs a laser power that can cope with processes with a sufficient margin. Therefore, the laser power can be raised when in reading to obtain a preferable read signal S/N ratio even at a higher recording density so as to reduce the influence by both laser and system noises. As described above, the recording medium in this embodiment enables an electric current to be flown therein when in reading, so that information comes to be recorded in the medium with less light absorption by the recording layer, and a large thermal diffusion, and a low recording sensitivity. Occurrence of read errors can also be suppressed even at a high reading laser power. For example, it is possible to set 2 mW for the recording laser power and 3 mW for the reading laser power.

When a 4-element array laser is used as the laser power supply, the data transfer rate can be improved by nearly four times faster than ever.

<Second Embodiment>

This second embodiment relates to a multi-layer recording medium and a recording apparatus that uses the medium.

Figure 15:
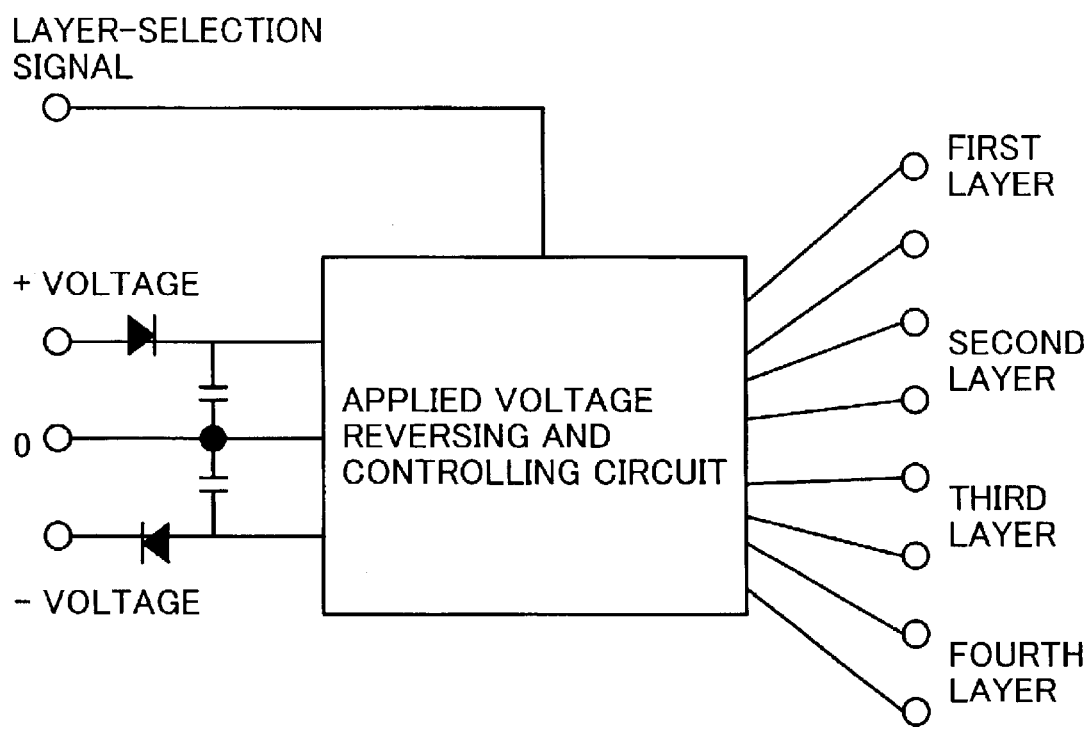
FIG. 15 is a block diagram of an applied voltage reversing and controlling circuit in the embodiment of the present invention.
Figure 16:
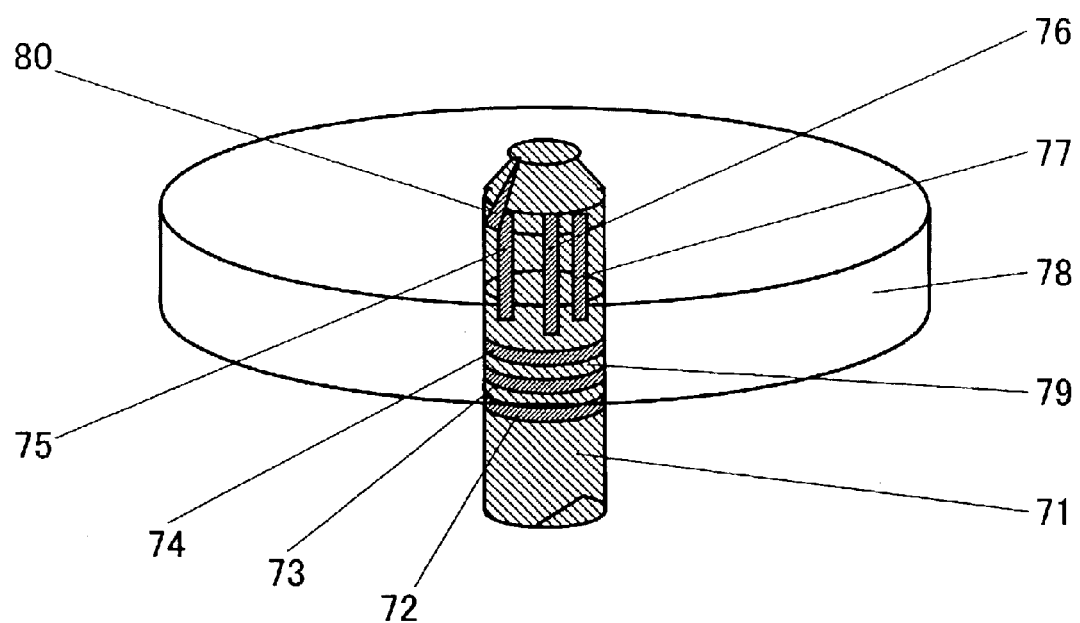
FIG. 16 is part of an electrode in a disk holder in which the information recording medium in the embodiment of the present invention is to be loaded.

FIG. 16 shows a structure of the recording apparatus around the rotary shaft in this embodiment. As described with reference to the block diagram of the applied voltage reversing and controlling circuit in FIG. 15, the recording apparatus supplies both plus and minus voltages and recording medium layer selection signals to three slip rings 72 to 74 of the rotary shaft. The maximum current applied to the rotary shaft from the circuit board of the recording apparatus can be reduced even when in fast coloring/decoloring by charging the current in a capacitor once, since the coloring/decoloring time is shorter than the recording time keeping the colored state. The circuit that includes such a capacitor as shown in FIG. 15 is built in the hollow space of the disk receiving part 78 and the wiring to each layer shown at the right end side of the block diagram is connected to the corresponding one of the rotary shaft electrodes 75 to 77 through the applied voltage reversing and controlling circuit. There are eight electrodes in this circuit and other five electrodes are disposed on a hidden surface (not shown here) of the rotary shaft. Consequently, a plus voltage is applied to a layer to be colored while a minus voltage is applied to the layer when it is discolored. Only the plus voltage may be applied from the circuit board of the recording apparatus to the rotary shaft. In this case, both plus and minus voltages are generated by a circuit built in the disk receiving part.

Figure 11:
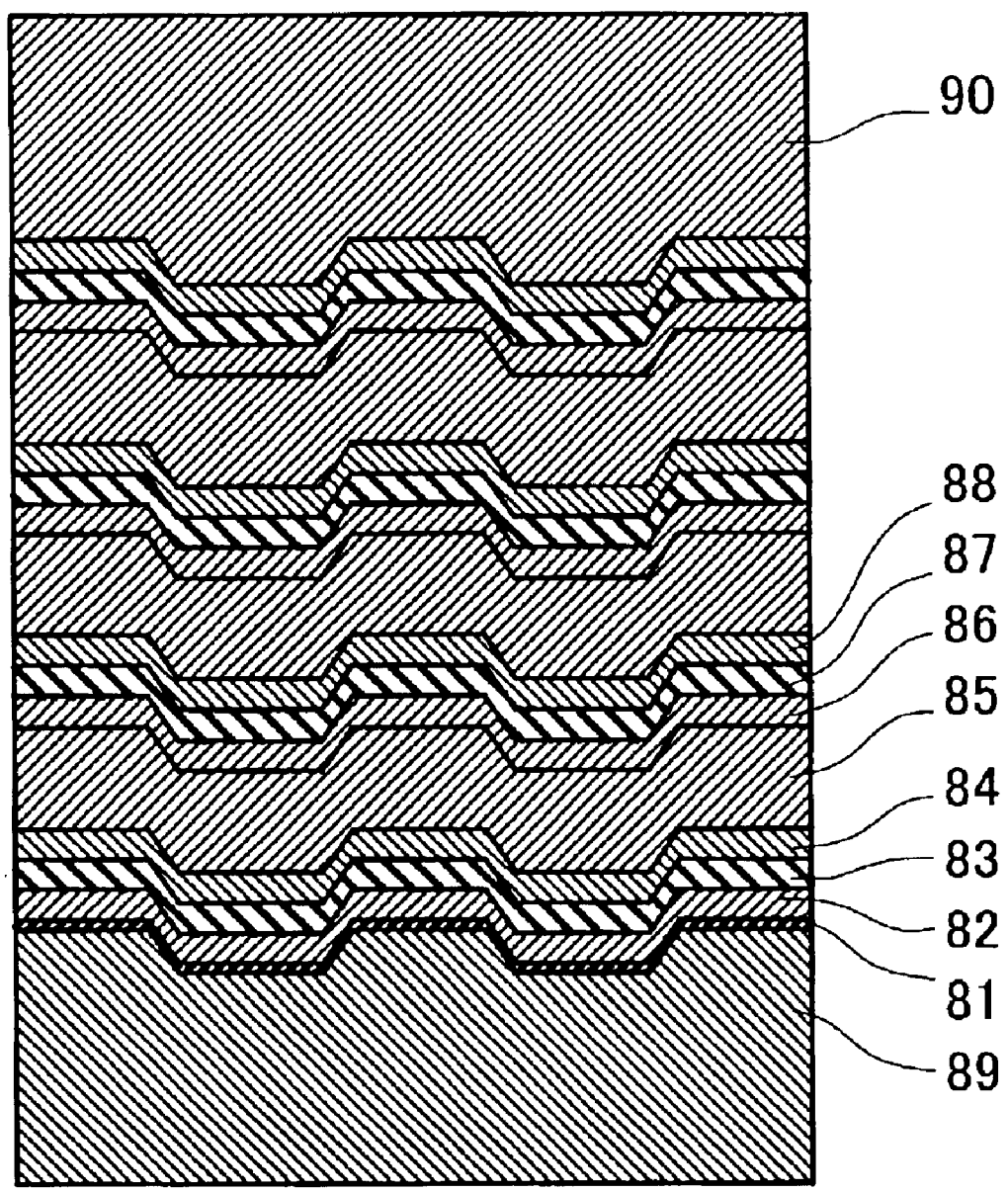
FIG. 11 is a structure of a stacked layer of a multi-layer disk of the present invention.
Figure 13:
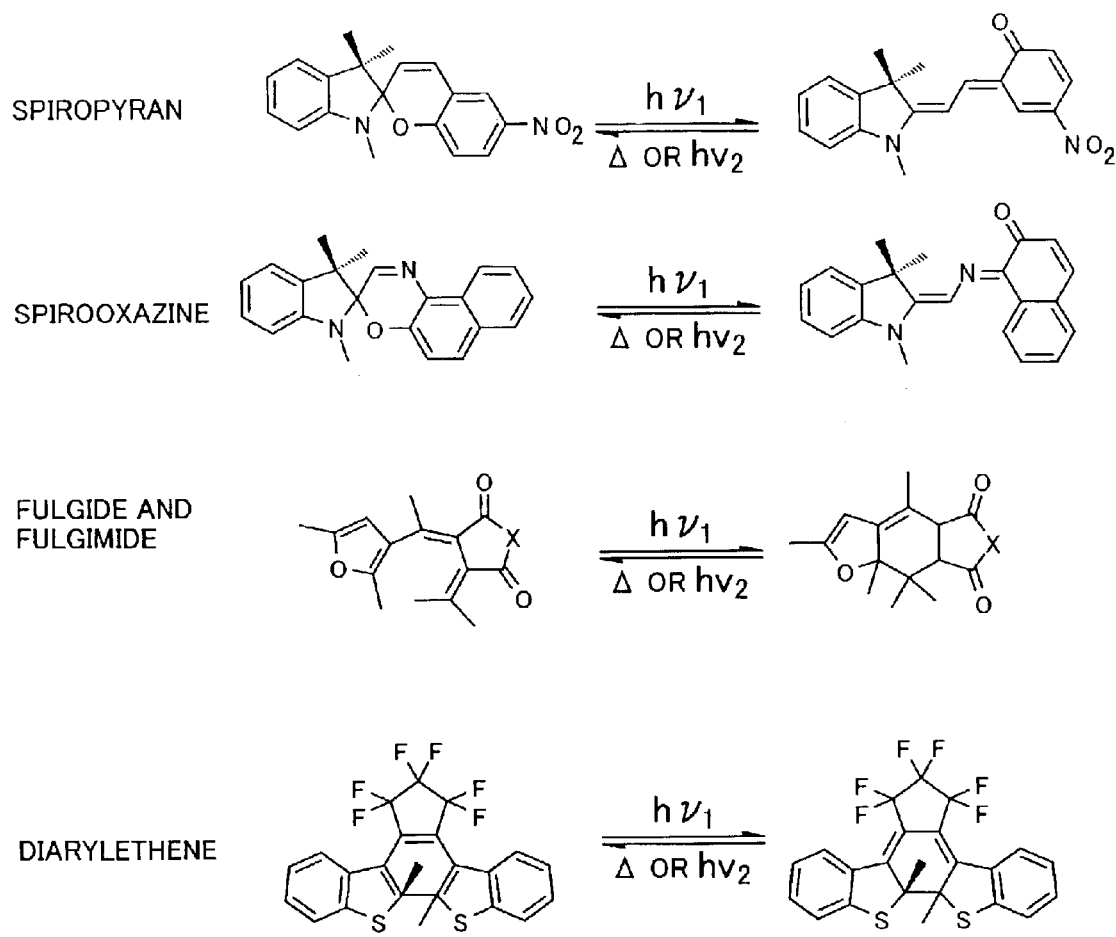
FIG. 13 is another molecule structure in an organic photo-chromic material.

The basic structure of the recording medium in this embodiment is the same as that in the first embodiment, but the recording layer is made of an electro-chromic material that is to be colored by an applied voltage. As shown in FIG. 11, the medium is 12 cm in diameter and 0.6 mm in thickness. The medium has a tracking groove formed at track pitches of 0.45 micron, a depth of 23 nm, a width of 0.23 micron and used for in-groove recording. The medium is fabricated by stacking electrodes and layers on a polycarbonate substrate 89 that holds address information as wobbles of the above groove in order of an $Ag_{94}Pd_4Cu_2$ half-transparent reflection layer 81, an ITO transparent electrode 82, an electro-chromic material layer 83, an ITO transparent electrode 84, a $ZnS.SiO_2$ insulator layer 85, an ITO transparent electrode 86, an electro-chromic material layer 87, an ITO transparent electrode 88, a $ZnS.SiO_2$ insulator layer, an ITO transparent electrode, an electro-chromic material layer, an ITO transparent electrode, a $ZnS.SiO_2$ insulator layer, an ITO transparent electrode, an electro-chromic material layer, and an ITO transparent electrode (four electro-chromic material layers are stacked such way). Furthermore, a polycarbonate substrate 90 that is 120 mm in diameter and 0.6 mm in thickness is stacked on the stacked layer. The laser beam is applied to the target on the medium from this protective substrate side. The electro-chromic material layer consists of two or three layers. When an electro-chromic material layer consists of three layers, concretely, it comes to consist of a 150 nm thick IrOx or NiOx (x: a positive number of 1 or under) layer that is an oxidation coloring type first coloring layer, a 300 nm thick $Ta_2O_5$ layer that is a solid electrolyte layer, and a 200 nm thick $WO_3$ layer that is a reduction-coloring second coloring layer. When an electro-chromic material layer consists of two layers, it comes to consist of a 200 nm thick OH ion accumulate layer consisting of $Cr_2O_3$ and a 200 nm thick coloring material layer consisting of $WO_3$. The transparent electrode farthest from the light incident side may be replaced with such a metallic electrode as W—Ti. When an electro-chromic material layer is formed by coating, the groove is filled step by step by stacked layers, so that the distance between electrodes at both sides of the recording layer differs between the land area and the groove area; the distance between the electrodes in the land area is shorter than that in the groove area. However, the distance between electrodes is not so different as that one of the electrodes is almost flattened just like in the first embodiment or one of the layers becomes an insulator layer having a through-opening.

The above stacked layer is over-coated by UV-curing resin and the disk is put together with another similar disk.

Then, a voltage is applied to the transparent electrodes disposed at both sides of the target recording layer from/in which information is to be recorded/read while a laser beam having a wavelength of 400 nm is irradiated to the target layer. Only the layer is then colored and the laser beam is absorbed/reflected from the layer, thereby information is recorded/read selectively therein/therefrom. There is no need to limit the voltage so as to be applied only to one recording layer at this time. When an array laser beam is used to record information in a plurality of recording layers simultaneously, the voltage is applied to between a plurality of pairs of electrodes. If the voltage to be applied to between electrodes in a non-target recording layer in which no information is to be recorded is set to a limited value (not 0), it is prevented to take much time to color the layer due to the capacitance between electrodes and the response speed of the material to be colored. If a reverse voltage is applied to a layer to be decolored by stopping the voltage application, the decoloring time is reduced to ½ or under.

Recording in the medium of the present invention is done as follows. The electro-chromic function of the recording film is weakened by a laser beam and/or electric current so that the layer is not colored by applying coloring voltage or it has an absorption spectrum different from that before the recording, and the recording marks are invisible by the laser beam when the layer is de-colored. The density of the film may be changed by the laser beam irradiation for recording. There are also other recording methods; for example, the recording layer is stacked on another layer, which is made of an organic or non-organic material in which at least one of the refractivity and the extinction coefficient is changed due to a physical change (ex., phase-change) or chemical change (ex., reaction to Li-ion) by a heat or electric current. Then, the recording is done according to such a change in this layer. For example, a phase-change recording film composed of $In_{50}Se_{45}T_{15}$ is preferable, since the transmissivity is high with respect to a laser beam having a wavelength of 780 nm or 660 nm, especially a laser beam having a wavelength of 780 nm. When in recording, the medium is heated indirectly due to the light absorption by the electro-chromic material layer. While the magnitude of photo-conductivity of the electro-chromic material layer depends on the used material, the layer usually has photo-conductivity. The layer can thus be heated effectively by the electric current of the photo-carrier. In the case where the medium includes a phase-change recording layer, crystallization or amorphization occurs in the layer when the layer is heated. As a result, the phase of the recording layer changes. In the case where the medium is designed so that the refractivity caused by a phase-change is recognized easily, especially as a reflectivity difference when the electro-chromic layer is colored, information can be read from each of the multi-layer recording films independently. And, if the optical film thickness between transparent electrodes is set approximately so as to become equal to the wavelength of the reading laser beam, all the recording layers become equal to each other optically.

A voltage may be applied to a plurality of layers simultaneously or sequentially so as to color those layers when in recording and/or reading in/from them. If the thickness of each layer formed between transparent electrodes is set equally to the focal depth of the focusing lens approximately and that the layer is colored in a mode that the light absorption coefficient set larger for the deeper-disposed layer, it is preferable for enabling high density recording by moveing the focal point in the depth direction. If each layer is a little more thinned, the medium will be suited for volume hologram recording. Almost the same light absorption coefficient may be set for all the layers that are more thinned so that a high power laser irradiation is done to be absorbed by all the layers including the deepest one, thereby recording is done to those layers while a low power laser is irradiated only to be absorbed by a layer closer to the light incident side, thereby recording is done only in the closer layer. This method enables multi-value recording. Furthermore, the present invention makes it possible to differ the light absorption coefficient among layers for recording from that for reading. When in recording, if the voltage applying time for coloring is changed for each layer so that the light absorptivity is set for each layer like 20%, 30%, 40%, and 50% differently among layers and the light absorptivity is fixed at 20% for each layer when in reading, the light reflected from the Ag—Pd—Cu layer comes to include the information of each layer in uniform. This is very preferable.

If all the stacked layers are divided into some groups, for example, if the four layers are divided into two groups so that each consists of two layers in this embodiment and the electro-chromic layers in the same group are colored/decolored simultaneously, the coloring/decoloring time is shortened. And, the recording characteristics will be more improved if the voltage and/or the dilution of the electro-chromic material with acrylic polymer is adjusted so that the farther the layer is disposed from the light incident side, the higher the light absorptivity becomes in the same group as described above.

There is also another method for controlling the coloring/decoloring time so as not to limit the recording/reading speed. According to this method, the layers are colored sequentially from the other side to this side at a view from the light incident side and colored in the reverse order. Consequently, while a layer is colored, a voltage is applied to the next adjacent layer to prepare to be colored. The coloring is thus speeded up.

As the electro-chromic material, such organic materials as thiophene organic olygomer and polymer typically as shown in FIG. 12 are usable in addition to $WO_3$. Especially, conductor organic materials would be better. For a thiophene molecule polymer, however, the laser wavelength is set at 660 nm and the track pitch is set at 0.6 $\mu$m, which is about double the value in embodiment 1. A thiophene material polymer is formed by vacuum deposition, electrolytic polymerization, or coating. In the case where the electrolytic polymerization is employed, poly(3-methylthiophene), which is a thiophene derivative, is used as monomer. And, LiBF4 is used as the supporting electrolyte and benzonitrile is used as the solvent.

In this connection, the electro-chromic material layer comes to consist of the following three layers; a layer used as both ion storage layer and dark-current blocking layer, which consists of $(CeO_2)_{67}(TiO_2)_{33}$; a solid electrolytic layer made of a material in which acryl UV curing resin is mixed with Li-triflate (official name: Li-trifluoromethansulfonate: $CF_3SO_3Li$) and a plasticizer; and a PEDT/PSS layer, that is, an electron activation conductor polymer coloring material layer made of a material in which poly (3,4 ethylenedioxythiophene) and poly (stylene sulfonate) are mixed. Before the thiophene polymer is formed, one of the ciano-group, the thiol group, and the S-asetyl group is added to the end portion of the thiophene molecule polymer. This is to have the longitudinal direction of the thiophene molecule polymer oriented in the film thickness direction, thereby having the current flown easily in the direction. For the organic solid electrolyte layer, polyethyleneoxide-thio-potacium-cyanate will be most suited. The above three layers are among those described as coloring control window glass materials and layers in the paper titled as "electrochromic Window Based on conducting Poly (3,4-ethylenedioxythiophene)-Poly(styrene sulfonate" in "Advanced Functional Materials vol. 12, No. 2 pp. 89–94 (February 2002) written by Mr. Helmut W. Heuer, et al.

The above-described PEDT/PSS layer may be replaced with SPEB. The SPEB is an electrochromic coloring polythiophene polymer material described in the paper written by Mr. Fei Wang, et al in Micromolecules vol. 33 pp. 2083–2091 (2000) Electrochromic Linear and StarBranched poly (3,4-ethylenedioxychiophene-didodecyloxybenzene) polymers. As a result, the coloring and decoloring can be more speeded up. The polymer synthesizing method and the film forming method are the same as those described in the above paper, but the above-described solid electrolyte is used as the electrolyte in this embodiment.

The solid electrolytic layer and the coloring material layer, which is made of an electron-active conductive polymer, are formed by polymerization underelectric-fie of a poly-thiophene layer. For example, the two layers can be united into one by implanting such the dopant as Li-trifrate in the layer. Such an organic material layer becomes conductive and the conductivity rises in proportion to a temperature rise. The layer can also have photo-conductivity, thereby the photo-carrier is accelerated by an electric field to improve the recording sensitivity upon a temperature rise and there is no need to input/output water in/from the film for coloring/decoloring, which is required for the WO3. A layer is colored by the electrons driven into molecules to be excited by a light. In order to neutralize this movement of electrons, such ions as Li are moved. The use of such an organic material layer also includes the following disadvantage; the film forming speed is slow and it is difficult to form large-area films. In order to solve this problem, monomer or low molecular weigh consisting of only a few linked molecules should be vacuum-deposited rapidly so as to be transformed into origomer on the substrate. This origomer forming process is performed by irradiating a blue or near-UV ray the target molecules so as to excite them during a vacuum-depositing process. For the origomer forming process, the following materials are usable; polymer of thiophene derivative (abbreviated as poly-thiophene), as well as such metallic phthalocyanin as Lu-di-phthalocyanin, peptyl-viologen, styril compound tungsten, 3,3 dimetyl-2-(P-dimethyl aminostyril) indorino[2,1-b] oxazorin (IRPDM) (light source wavelength: 5145 nm) and 3,3 di-metyl-2(P-di-metyl aminocynnamiridenvinyl)indorino[2,1-b] oxazoril that are styril compounds. In addition, the film may be formed by coating.

Furthermore, in order to provide the medium with a photo-conductor effect, a TCNQ (7,7,8,8-Tetracyanoquinodimetohane)layer may be formed therein. Even when those organic matters are used, other portions of the disk are formed just like in the above embodiment.

As inorganic materials instead of the $WO_3$ any of pllucianblue ($KxFe^{II}yFe^{III}z(CN)_6$, $MoO_3$, $NbO_5$, $V_2O_5$, $TiO_2$, NiOOH, CoOOH, $Rh_2O_3$, IrOx (x: a positive number under 1), ZrNCl, InN, SnNx (x: a positive number under 1), MnOx (x: a positive number under 2), and $WO_3$-$MoO_3$ compound (mixture) films is usable.

When most of the positive ions are moved out of a predetermined place in any of such metals as Li and hydrogen or when most of the electrons existing in the base state of a light spot are excited due to an applied current, the electro-chromic material causes the light absorption to be reduced automatically, thereby the current flow is apt to be disturbed. It is thus prevented that a large current flows in the whole disk and/or an excessive current flows in the light spot, resulting in excessive growth of recording marks. In other words, the following phenomenon occurs; when a laser beam is irradiated to between the first and second electrodes while a voltage is applied thereto, the current in the irradiated spot increases. And, if a voltage is kept applied thereto even after the end of the laser irradiation, the current decreases in a certain time, then the recording layer (electrochromic layer or the like) status changes. The current might thus decrease automatically during the laser irradiation.

The electro-chromic material layer may be replaced with a layer made of a material in which an electro-luminescent (EL) material and a photo-chromic material are mixed. The color of the photo-chromic material is changed by a light emitted from the EL material, thereby light absorption occurs due to the recording or reading laser beam wavelength. Usable EL materials are such non-organic materials as ZnO or the like, as well as organic materials. The organic material may be, for example, a combination of the photo-chromic material and a material whose emitted light wavelength is equivalent to that used to change the color of any of such photo-chromic materials as diarylethene, fulgide, etc. selected from among the organic EL materials described on pp. 3 to 22, No. 2, vol. 33 of the R&D Review published by Toyota Chuo Kenkyu-sho. For a layer made of any of those organic materials, the vacuum-deposition, vapor phase deposition, and coating methods are employable. When coating is selected, the material is thinned enough by a solvent so that the film thickness difference is almost eliminated from between the groove areas. An organic EL material consists of an electron layer or hole transfer layer and a luminescent layer material. A tri-phenyl amine material is included in the EL material when the efficiency is improved. The hole transfer layer material may be, for example, star-burst amine (m-MTDATA) (film thickness: 60 nm) obtained by shaping tri-phenyl amine into star-like molecules and the luminescent layer material may be benzo-oxasol Zn complex ($Zn(BOX)_2$) (film thickness: 40 nm) is used to develop the color.

The photo-chromic material may be any of fulgide, diarylethene, etc. as shown in FIG. 12. When fulgide is used, the light absorption occurs around a wavelength of 500 nm due to an irradiated blue laser beam. A Kr laser having a wavelength of 514.5 nm is thus usable for recording.

For small-sized recording media in which a high sheet resistance is not regarded as a problem, any of such conductive polymers as polyacethylene, polychiophene, etc. is usable to form transparent electrodes. This is favorable, since the refractivity related to electro-chromic material layers is smaller than that of e-inorganic transparent electrodes, so that the adverse interference by the light reflected from the boundary layer is avoidable. As a subbing-layer, a layer made of a hydrophobic surface treatment agent, a silane coupling agent, or thin copper group element (Cu, Ag, Au) having an average film thickness of 0.5 to 3 nm may be formed.

Similarly, the heat insulator layer should preferably be formed with an organic material in the optical point of view. The insulator layer may have conductivity, but it should preferably not. Many more materials such as acryl-derivative origomer, polymer, and metal-phthalocyanine vacuum-deposited film are usable for the insulator layer.

Furthermore, organic materials used for EPD, that is, electrophoresis display media, or a conductive organic material layer whose absorption edge changes according to a temperature rise caused by the current may be used.

A phase-change material layer may also be used as a recording layer. For example, in the case where a red laser power source is used, a phase-change recording layer that includes such Se as In—Se, In—Se—Tl, or the like by 30 atomic % or over does not absorb the laser beam so much and its phase changes due to the indirect heating by the light absorption by the electro-chromic layer and/or the effect of current. The phase-change recording layer has a high refractivity, so that the film thickness of the transparent electrodes should be decided so as to prevent the light reflection from the boundary surface.

Every multi-layer film may be within the focal point of the focusing lens, but it is also possible to dispose a 20- to 40-micron thick spacer layer between layer groups consisting of several layers respectively to change the focal point to record/read information in/from each layer. In this case, when two or more thick spacer layers are to be used, the optical system should be provided with an element that compensates the spherical aberration.

The recording/reading method in this second embodiment is the same as that in the first embodiment.

<Third Embodiment>

Figure 14:
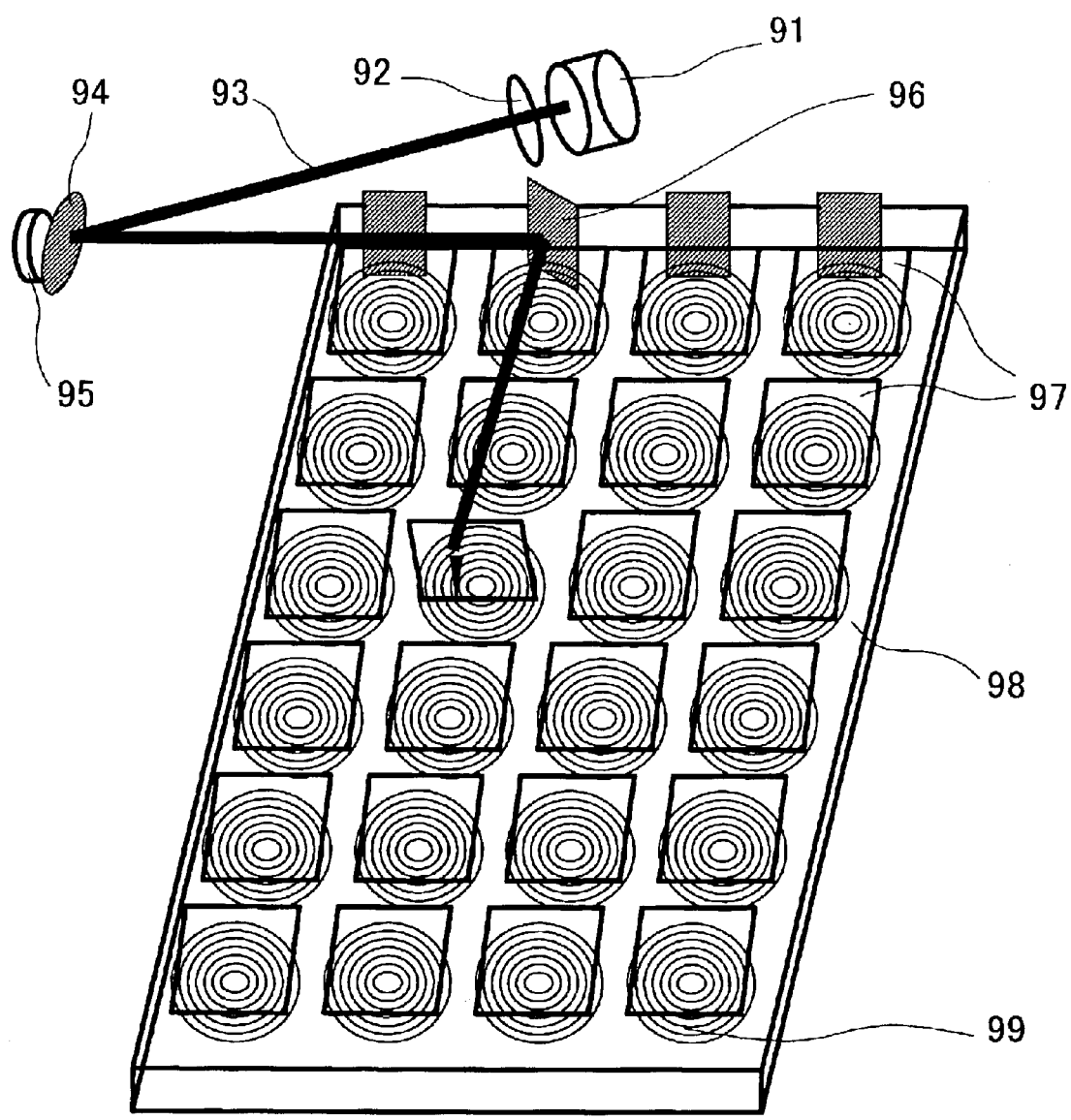
FIG. 14 is a structure of the information recording medium and an optical system in the embodiment of the present invention.

In this third embodiment, as shown in FIG. 14, the laser 91 is attached on a surface slightly inclined from the right angle of the rotary shaft of the mirror driving motor 95 so that the laser beam 93 is reflected so as to be moved in a circular or elliptic pattern by the mirror 94 that rotates fast. A light spot is then formed by a 4×6 reflection mirror array 97 made of a silicon crystal in accordance with one of the MEM techniques, thereby information is recorded in the medium fast without moving the recording medium fast. In FIG. 14, reference numerals are defined as follows; 92 denotes a lens, 96 denotes an array selection mirror, 98 denotes a Si wafer, 99 denotes a cross sectional view of a recording layer film. The shape of the entire medium is not disk-like, but it is rectangular. Each mirror is driven by an electrostatic or electromagnetic force generated from a transistor array disposed just under the mirror.

Many cone-shaped recesses are formed and disposed regularly in both vertical and horizontal directions similarly to the process for forming an ordinary original optical disk. The recesses are 1um in diameter and 0.4 $\mu$m in depth. The distance between the centers of those recesses is set at 1.5 $\mu$m. The cross sectional view of the recesses at a plane parallel to the substrate may be slightly elliptic. On this substrate are formed four layers by means of spattering in order of a heat dispersing Ag94Pd4Cu2 layer (thickness: 50 nm), a ZnS—SiO2 protective layer (thickness: 50 nm), a Ge—Sb—Te recording layer (thickness: 30 nm), and a ZnS—SiO$_2$ protective layer (thickness: 50 nm). Finally, an Al$_{98}$Ti$_2$ electrode layer is formed at a thickness of 70 nm on the stacked layer. Furthermore, a 100 $\mu$m thick polycarbonate sheet is stacked thereon with UV-curing resin therebetween. After the UV-curing resin is cured/bonded, the sheet is removed. The stacked film on the flat surface is thus removed and the stacked film only in the cone-shaped recesses are left, thereby the cross section 99 of the stacked layer is exposed. Information is recorded in this cross sectional portion. If the substrate surface is activated beforehand by means of UV ray irradiation, the entire Ag alloy layer, which is the first stacked layer, is left together with that on the flat portion of the substrate. The left-over portion can be used as an electrode. After the cross sectional portion 99 is exposed, a 30 nm thick SiO$_2$ layer and a 70 nm thick ITO transparent electrode layer are formed thereon. As a result, almost no Sio$_2$ layer is stacked on the slope to each cone-shaped recess and the transparent electrode film comes in contact with the top electrode layer directly. The laser beam can thus be irradiated to the cross sectional portion 99 to assist the recording there while a voltage is applied to between the bottom Ag alloy and the top ITO layer. When the upper insulator layer is not put in contact with any transparent electrode, the protective layer of the cross sectional portion 99 is etched by dilute acid quickly, then a thick TiO$_2$ layer is formed in the cross sectional portion 99. The TiO$_2$ layer then becomes a solid immersion cylindrical lens built in the barrel-shaped medium, thereby the laser beam is condensed enough and irradiated on the cross sectional portion 99 of the recording layer.

The Ge—Sb—Te recording layer may be replaced with a stacked film consisting of the thiophen polymer or WO$_3$ electro-chromic material layer described in the second embodiment to obtain satisfactory characteristics. Recording is done by damaging the coloring capability of the electro-chromic material layer by a heat.

On the other hand, it is also possible to form grooves on the substrate surface and record information in the grooves just like the recording on conventional optical disks. In this case, eight grooves are formed in parallel to the disposed reflection mirror arrays. The interval for disposing the reflection mirror arrays is double that of grooves. By changing the angle of each of those mirrors, recording can be made in either of the two grooves. Usually, recording is done in one of the grooves, then in the other. The recording medium in this third embodiment has a multi-layer structure just like in the second embodiment. The material used for each layer may be any of organic and non-organic materials as described in the second embodiment. The groove may not be shaped linearly; it may be formed like a concentric circle or spiral under each mirror.

In any of the above cases, each portion of the target layer may be irradiated not via a mirror array, but via a moving mirror.

If a four-element array laser power source is used, the laser beam is irradiated on the upper four mirrors simultaneously to speed up the data transfer by nearly four times.

The number of reflection mirror arrays can be increased up to about 1000×1000 when a large capacity is required.

The recording and reading methods in this third embodiment are the same as those in the first embodiment.

Our invention also includes the following.

1. An information recording apparatus for recording information in said information recording medium by means of irradiation of a light focused on said medium, said apparatus including:

a rotary shaft for rotating said medium; and a motor for rotating said rotary shaft;

wherein a plurality of electrodes are disposed at said rotary shaft or a portion of a disk receiving part attached to said rotary shaft, adjacent to the center hole of said medium.

2. The information recording apparatus according to above 1;

wherein said rotary shaft has positioning means used to fix a position of said disk relatively with each of said plurality of electrodes.

The information recording medium of the present invention therefore enables a high electric field to be applied in a narrow range, thereby the medium turns fast to enable fast recording and high density recording permissively to both auto-focusing and tracking offset offsets.

Furthermore, the information recording medium enables many more layers to be stacked than any conventional media, so that the practical recording density is improved and the recording capacity per medium is expanded significantly.

What is claimed is:

1. An information recording medium for recording information by means of light irradiation, including at least:
   a substrate;
   a first transparent electrode formed on said substrate;
   a recording layer including an electro-chromic material and formed on said first electrode; and
   a second transparent electrode formed on said recording layer,
   wherein said recording medium further includes one or more additional recording layers each including an electro-chromic material formed between transparent electrodes, said one or more recording layers being different from said farthest one from the light incident side.

2. The recording medium according to claim 1, wherein said electro-chromic material is a conductive electro-chromic material.

3. The recording medium according to claim 1, wherein a phase-change recording layer is formed between said recording layer and either of said two transparent electrodes on both sides.

4. The recording medium according to claim 1, wherein a photo-conductor layer is formed between said recording layer and either of said two transparent electrodes on both sides.

5. The recording medium according to claim 1, wherein said medium is circular in form and has a third electrode that is long in the radial direction of said medium and narrow, said third electrode supplying an electric current to said first and second electrodes.

6. The recording medium according to claim 1, wherein at least either of said transparent electrodes on both sides of the recording layer is divided into a plurality of electrodes.

7. The recording medium according to claim 4, wherein a conductor layer is formed between said recording layer and said photo-conductor layer, said conductor layer having a thickness of 1 nm to 10 nm.

8. The recording medium according to claim 1, wherein the capacitance between said first and second electrodes is over 0.01 F to 0.1 F.

9. An information recording medium for recording information by means of light irradiation, including:
   a substrate;
   a first conductor film formed on said substrate;
   an insulator film formed on said first conductor film and having a through opening;
   a recording film formed so as to be extended from said through opening onto said insulator film and enabled to record information therein; and
   a second electrode formed on said recording film.

10. The information recording medium according to claim 9, wherein a photo-conductor film is formed between said recording film and said second electrode.

11. The information recording medium according to claim 9, wherein
   said medium has a land area and a groove area in the radial direction thereof;
   said recording film is formed over said through opening existing in either said land area or groove area;
   said insulator film exists in the other of said land and groove areas; and
   the distance between said first and second electrodes at a portion different from said through-opening is 1.1 or more when the distance between said first and second electrodes in said through-opening is 1.

12. The information recording medium according to claim 9, wherein
   said information recording medium has a land area and a groove area in the radial direction thereof;
   said recording film is formed over said through-opening existing in one of said land area and said groove area;
   said insulator film exists in the other of said land area and said groove area; and
   the distance between said first and second electrodes in a portion different from said through-opening is 2 or more when the distance between said first and second electrodes in said through-opening is 1.

13. The information recording medium according to claim 1, wherein said electro-chromic material is a tungsten oxide or thiophene derivative material.

14. An information recording method for recording information in a plurality of spots on an information recording medium by means of light irradiation, said method comprising:
   providing said medium including at least a substrate; a first conductive film formed on said substrate; a recording layer including an electro-chromic material formed on said first conductor film; and a second conductor film formed on said electro-chromic material layer,
   wherein providing said medium further includes having one or more additional recording layers formed between conductive films, each additional recording layer including an electro-chromic material.

15. The information recording method according to claim 14;
   wherein information is recorded on said information recording medium by applying a voltage to at least two of divided conductive films wherein said divided conductive films are formed by dividing at least one of said first and second conductive films.

16. The information recording method according to claim 14;
   wherein said medium applies a voltage to the conductive films disposed at both sides of a predetermined one of said plurality of electro-chromic layers to record or read information in said predetermined electro-chromic material layer, said voltage being different from that applied to the conductive films disposed at both sides of other recording films.

17. The information recording method according to claim 14;

wherein a light is irradiated to between said first and second conductive films while a voltage is applied thereto and said voltage is kept applied even after the end of said light irradiation.

* * * * *